United States Patent
Schoenfelder et al.

(10) Patent No.: US 11,625,965 B2
(45) Date of Patent: Apr. 11, 2023

(54) SMART BUILDING INTEGRATION AND DEVICE HUB

(71) Applicant: Latch, Inc., New York, NY (US)

(72) Inventors: Luke A. Schoenfelder, New York, NY (US); Michael B. Jones, New York, NY (US); Saayuj Dhanak, New York, NY (US); Albert A. Ho, New York, NY (US); Jonathan Kieliszak, New York, NY (US); Deepthi Gandhi, Hoboken, NJ (US); Nabeel Allana, Brooklyn, NY (US); Andrew Kontra, San Francisco, CA (US); Tyler Gage, Brooklyn, NY (US); Nathan Ferris, New York, NY (US); Ryan Merlini, New York, NY (US); John T. Jacobsen, New York, NY (US); Tim Stonelake, New York, NY (US); Niranjan Ravichandran, Jersey City, NJ (US)

(73) Assignee: Latch Systems, Inc., New York, NY (US)

( * ) Notice: Subject to any disclaimer, the term of this patent is extended or adjusted under 35 U.S.C. 154(b) by 0 days.

(21) Appl. No.: 17/473,417

(22) Filed: Sep. 13, 2021

(65) Prior Publication Data

US 2021/0407229 A1   Dec. 30, 2021

Related U.S. Application Data

(63) Continuation of application No. 17/085,160, filed on Oct. 30, 2020.

(Continued)

(51) Int. Cl.
G07C 9/00 (2020.01)
G05B 15/02 (2006.01)
H04W 4/80 (2018.01)

(52) U.S. Cl.
CPC ......... G07C 9/00309 (2013.01); G05B 15/02 (2013.01); H04W 4/80 (2018.02); G05B 2219/2642 (2013.01)

(58) Field of Classification Search
CPC ...... G07C 9/00309; H04W 4/80; G05B 15/02
See application file for complete search history.

(56) References Cited

U.S. PATENT DOCUMENTS

| 9,425,981 | B2 * | 8/2016 | Foster | H04M 11/025 |
| 10,685,516 | B1 * | 6/2020 | Raduchel | H04M 3/537 |

(Continued)

FOREIGN PATENT DOCUMENTS

WO    2009088901 A1   7/2009

OTHER PUBLICATIONS

European Search Report and Written Opinion for the European Patent Application No. EP21172878, dated Oct. 18, 2021, 8 pages.

(Continued)

Primary Examiner — Yong Hang Jiang
(74) Attorney, Agent, or Firm — KDW Firm PLLC

(57) ABSTRACT

Embodiments are generally directed to systems, devices, methods, and techniques to control devices via a mobile device platform in a smart building system. Embodiments further include techniques to determine a device of the smart building system and an action to perform by the device. The techniques include establishing, a connection with a smart lock of the smart system, and communicating a request to perform the action to the smart lock of the smart system.

20 Claims, 25 Drawing Sheets

Related U.S. Application Data

(60) Provisional application No. 62/946,167, filed on Dec. 10, 2019, provisional application No. 62/933,023, filed on Nov. 8, 2019.

(56) References Cited

U.S. PATENT DOCUMENTS

| | | |
|---|---|---|
| 11,151,827 B1 * | 10/2021 | Gant .................... G06K 7/1417 |
| 2013/0017812 A1 | 1/2013 | Foster |
| 2015/0035987 A1 * | 2/2015 | Fernandez ............ H04N 7/186 |
| | | 348/156 |
| 2015/0199863 A1 * | 7/2015 | Scoggins ................ G07C 9/28 |
| | | 340/5.25 |
| 2018/0089917 A1 | 3/2018 | Obaidi |
| 2018/0282114 A1 | 10/2018 | Baldi et al. |
| 2019/0051144 A1 * | 2/2019 | David ................ G08B 21/0272 |
| 2020/0036709 A1 | 1/2020 | Mars et al. |
| 2020/0043270 A1 * | 2/2020 | Cate .................. G07C 9/00571 |
| 2020/0302716 A1 * | 9/2020 | Raduchel ............ H04M 11/025 |
| 2020/0327758 A1 | 10/2020 | Ma et al. |
| 2021/0043199 A1 * | 2/2021 | Liu .......................... G06F 21/32 |
| 2021/0056786 A1 | 2/2021 | De La Garza et al. |

OTHER PUBLICATIONS

International Search Report and Written Opinion for the Application No. PCT/US21/65645, dated Mar. 25, 2022, 8 pages.

\* cited by examiner

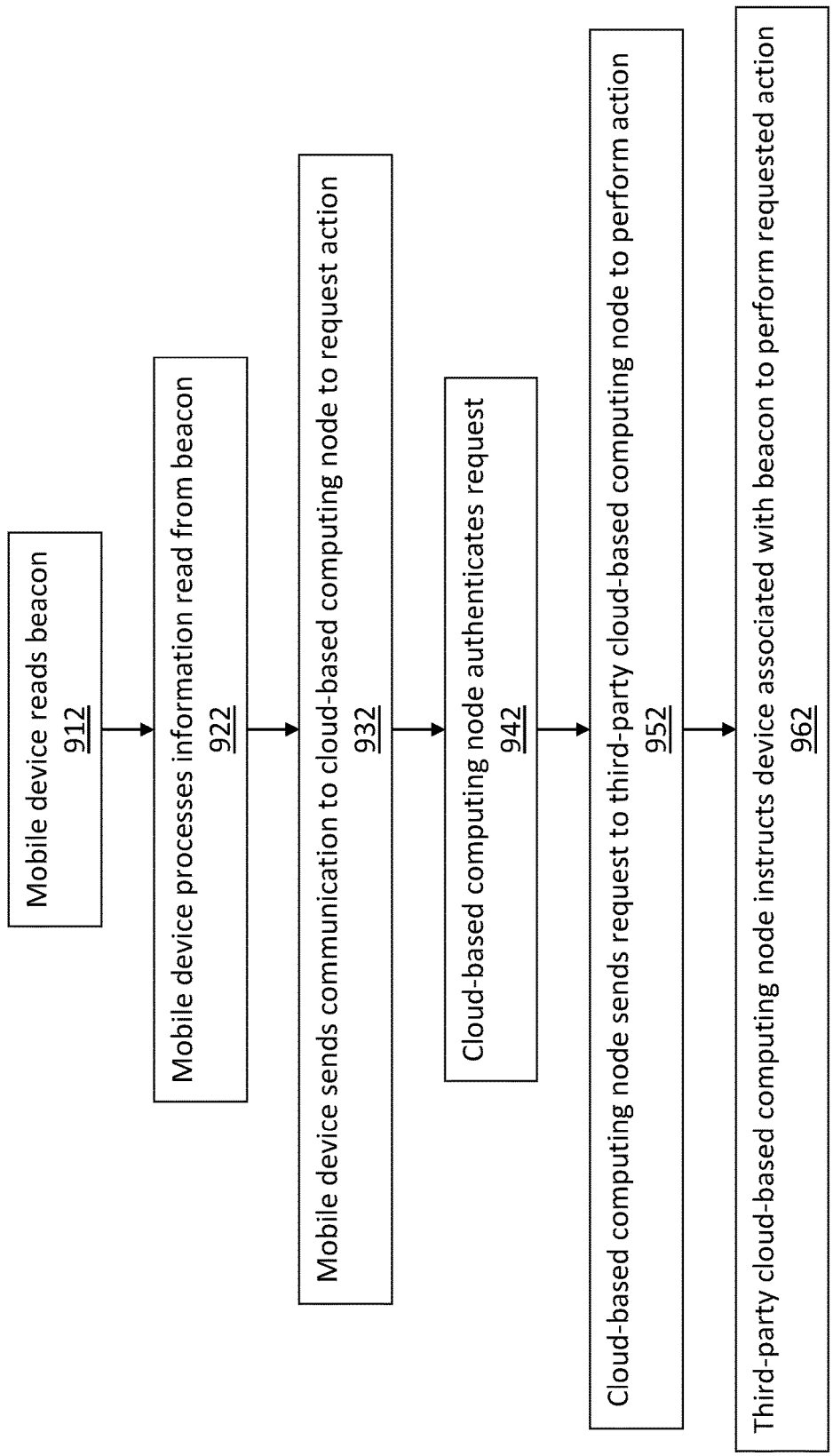

SMART BUILDING INTEGRATION AND DEVICE HUB

CROSS-REFERENCE TO RELATED APPLICATIONS

This application is a Continuation of U.S. patent application Ser. No. 17/085,160, filed on Oct. 30, 2021, which is a Non-Provisional of U.S. Provisional Application No. 62/946,167, filed on Dec. 10, 2019, and also a Non-Provisional of U.S. Provisional Application No. 62/933,023, filed on Nov. 8, 2019. The contents of both aforementioned patent applications are incorporated herein by reference in their entireties.

TECHNICAL FIELD

The present invention relates to smart devices, and more particularly to smart building systems that integrate access point and smart device systems.

BACKGROUND

Smart access control systems can implement smart access control devices, electronic door activating hardware, and a backend system that together can manage credentials and authorizations. The readers receive credentials from users (for example, via a mobile device) and determine whether that user is authorized to perform its desired action, e.g., be allowed access to a particular area. If it is determined that the user is authorized to perform its desired action, the access control device or an associated access device can unlock the electronic door activating hardware.

Traditional access control systems lack the ability to integrate with other smart building and home devices. Smart devices can include, for example, devices that are capable of being controlled remotely through a networking protocol, such as, but not limited to Internet Protocol (IP), Bluetooth, Zigbee, or Z-wave. Furthermore, building management companies who install smart devices in common areas and restricted spaces within the building (e.g., an apartment or gym) must coordinate many different types of credentials across many different types of systems.

BRIEF DESCRIPTION OF FIGURES

FIGS. 9A-9D are block diagrams showing operation of beacon-based access systems, according to some embodiments.

DETAILED DESCRIPTION

In some embodiments, an integrated smart building access and smart device system are disclosed. The integrated system allows for a centralized credentialing process to provision and administer operation of access points and smart devices. Embodiments of the present disclosure increase operational efficiency, reduce errors from maintaining user information in multiple systems, increase security, reduce energy costs by allowing property managers to regulate the temperature of unoccupied areas, and provide users with unique amenities that can be costly or burdensome to administer without centralized credentialing. Furthermore, users of the system can control, manage, and gain access to access points and devices using a single interface, such as an application or web interface.

Figure 1A:
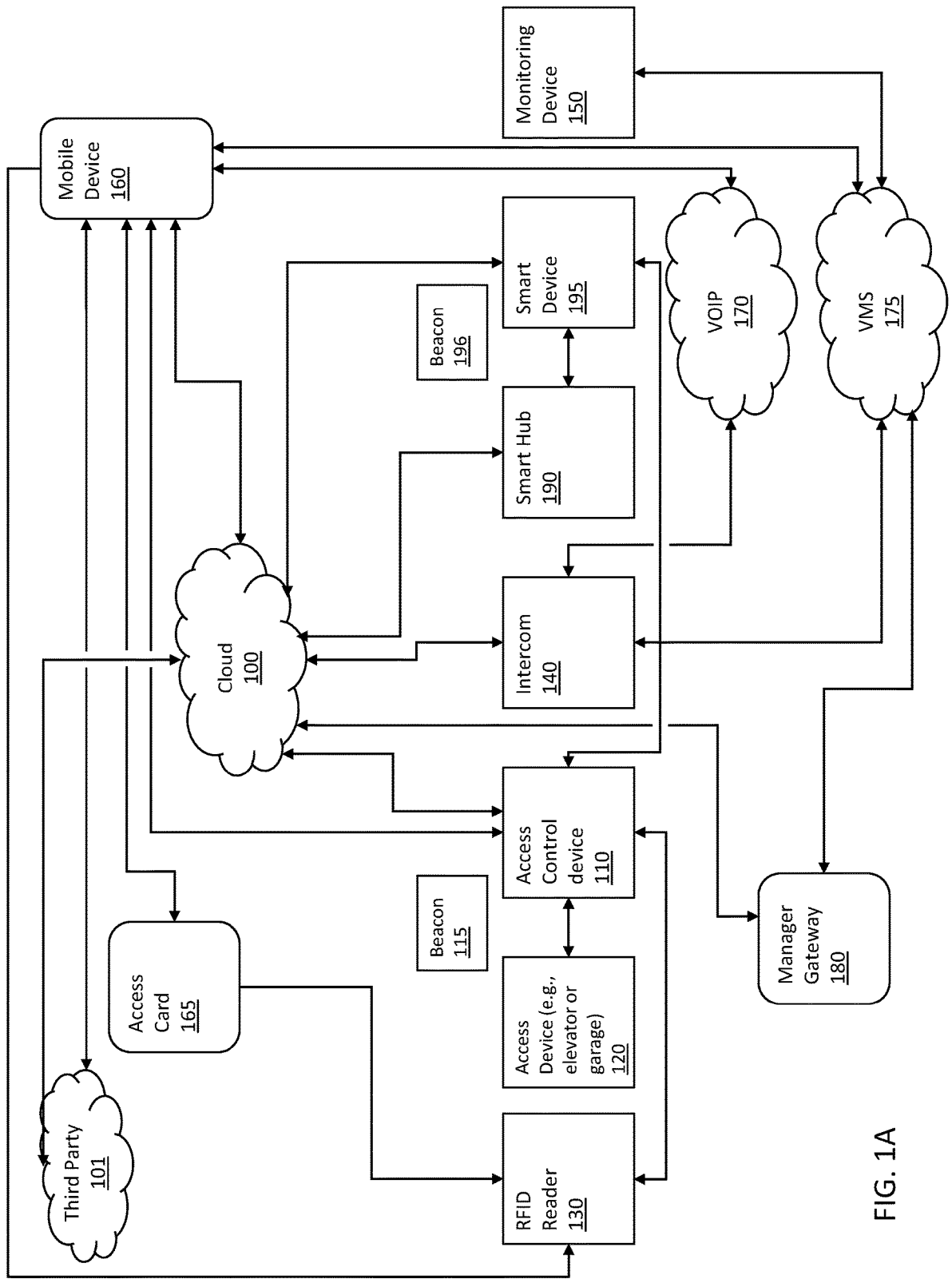
FIGS. 1A-1B are diagrams showing system architectures for smart building and home systems, according to some embodiments.

FIG. 1A is a diagram showing a system architecture for a smart building system, according to some embodiments. The smart building system can include one or more of a cloud-based computing system 100, at least one smart access control device 110, at least one beacon 115, at least one access device 120, at least one NFC or RFID reader 130, at least one intercom 140, at least one monitoring device 150, at least one mobile device 160, at least one access card 165, at least one voice-over-IP (VOIP) network 170, at least one video management system (VMS) network 175, a management gateway 180, at least one smart hub 190, at least one smart device 195, a third party cloud based computing system 101, or at least one beacon 196.

In some embodiments, cloud-based computing system 100 includes one or more remote servers that can communicate with remote devices over a communications pathway, such as the internet or a cellular network. Cloud-based computing system 100 can store information about users of the smart building system, connect with a management gateway 180 to provide for management of the smart building system, and provide access and sharing privileges (e.g., via provisioning of credentials) for usage of the smart building system. Management gateway 180 can be any type of computing device such as, but not limited to a desktop or laptop computer, a smart phone, a tablet, a server, etc. Cloud-based computing system 100 can further provide monitoring and/or alert functionalities, as described in more detail below.

In some embodiments, the smart building system can include one or more access technologies that permit access to access points (such as doors) in the smart building systems based on credentials generated by the cloud-based computing system 100. For example, one or more smart access control devices 110 can include an integrated electronically actuated lock, which locks or unlocks upon receiving and authenticating a valid credential generated by cloud-based computing system 100. In some embodiments, a separate remote card or signal reader, such as an NFC or RFID reader 130 (e.g., at a garage door or elevator) can provide information to an access control device 110 to determine whether an entrant (e.g., into a garage or elevator) is authorized. In some embodiments, a separate access device 120 such as a control panel on an elevator or an automatic garage door opener can receive a credential from the NFC or RFID reader 130 and/or access control device 110 and provide for access to other access points such as a garage door or elevator, respectively, upon authentication of the valid credential. In some embodiments, as described in more detail below, a beacon 115 can be associated with a smart access control device 110, an access device, or both. As described in more detail below, the beacon 115 can contain information to assist with gaining access to the access point. In some embodiments, the beacon 115 can be a near field communication (NFC) tag, a QR code, BLE device, or other physical beacon that allows for encoding a link to tell the system what action to perform.

Figure 11:
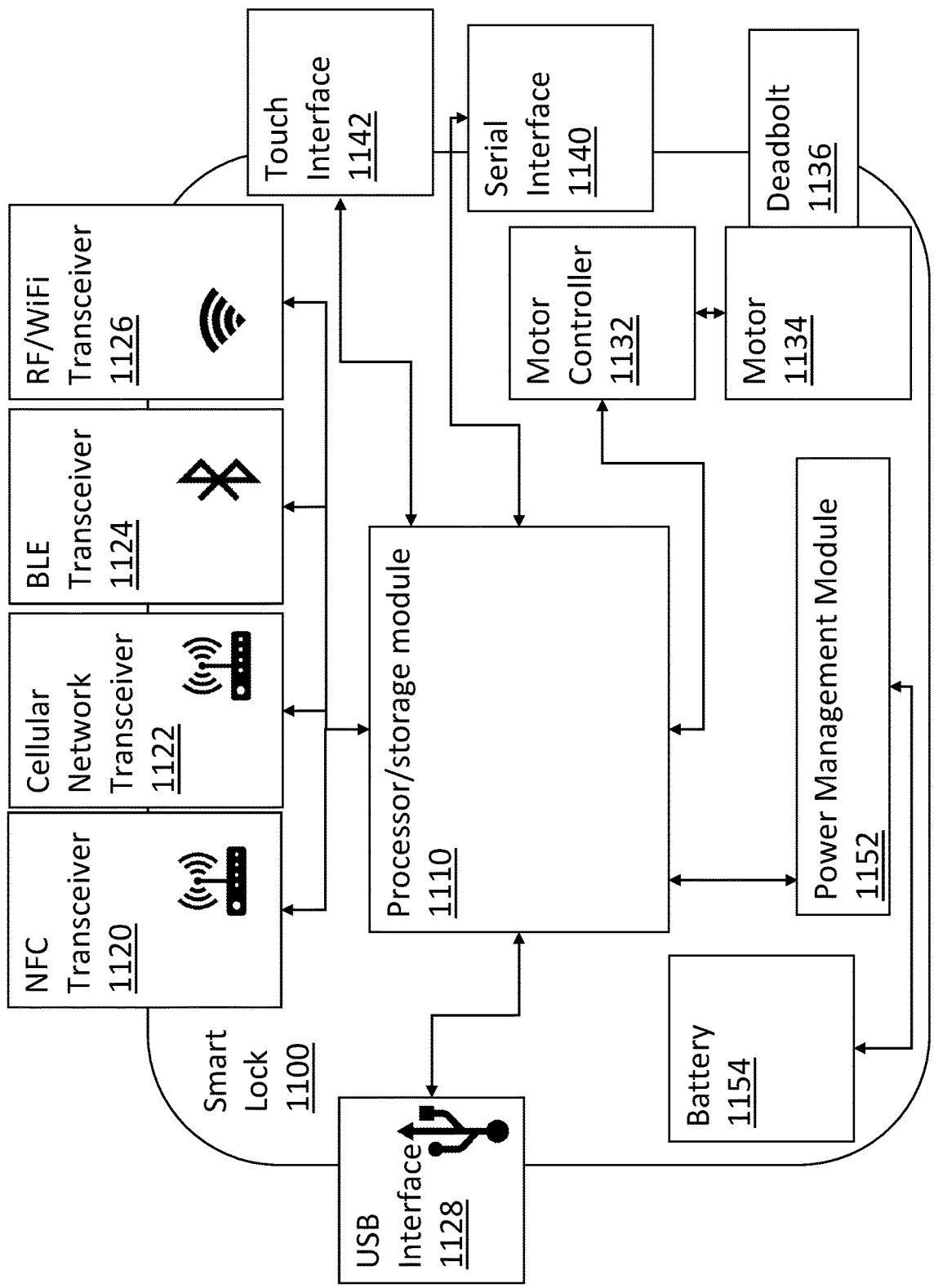
FIG. 11 is a block diagram of a smart lock, according to some embodiments.

FIG. 11 is a block diagram of a smart lock 1100, according to some embodiments. As shown in FIG. 11, the smart lock 1100 can include a processor/storage module 1110, an array of communication interfaces including transceivers (e.g., NFC transceiver 1120, cellular network transceiver 1122, BLE transceiver 1124, and/or RF/WiFi transceiver 1126), a USB interface 1128 (or other serial bus), a touch-sensitive interface 1142, a serial interface 1140, a locking assembly (e.g., including a motor controller 1132, a motor 1134, and deadbolt 1136), a battery 1154, and/or a power management module 1152. The processor/storage module 1110 can include instructions thereon that, when executed, cause it to perform the functions discussed throughout the present disclosure. For example, the processor/storage module 1110 can be configured to receive or transmit information via one of NFC transceiver 1120, cellular network transceiver 1122, BLE transceiver 1124, RF/WiFi transceiver 1126, and/or USB interface 1128. The processor/storage module 1110 can be configured to instruct the motor controller 1132 to control the motor 1134 to unlock the deadbolt 1136. The processor/storage module 1110 can be configured to identify the presence or absence of a person or object using information from a serial interface 1140, such as a camera, or proximity sensing using the touch interface. The processor/storage module 1110 can be configured to receive user input via a touch interface 1142. The processor/storage module 1110 can be configured to instruct power management module 1152 to control the battery 1154 and use thereof to power any of the elements in the smart lock 1100. In some embodiments, the features and components of the smart hub 1300 may be integrated into an access control device 110, such as smart lock 1100. In other words, the smart lock 1100 may operate as a smart hub, as discussed herein.

Figure 14:
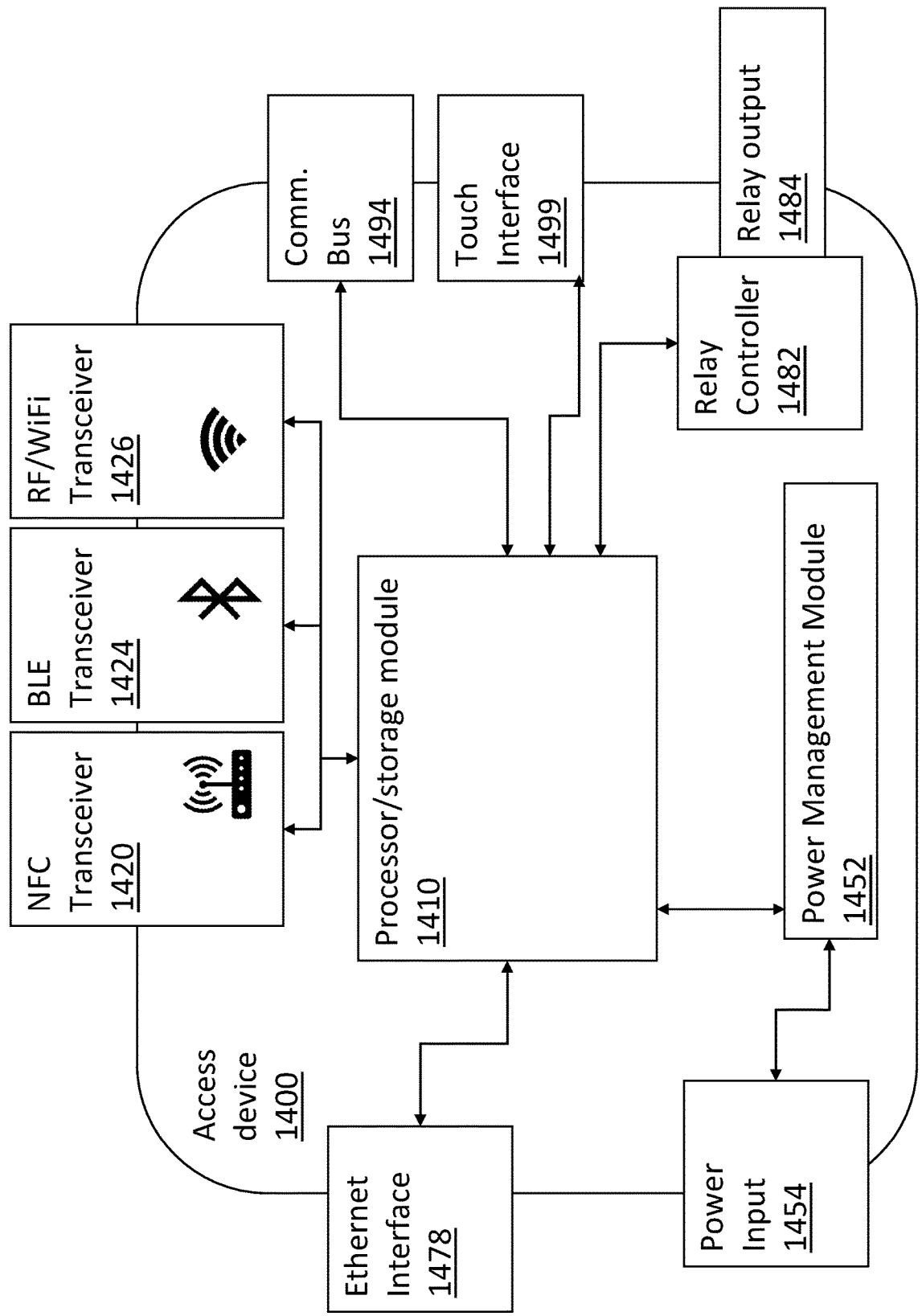
FIG. 14 is a block diagram of a smart access reader, according to some embodiments.

FIG. 14 is a block diagram of a smart access reader 1400, according to some embodiments. As shown in FIG. 14, the smart access reader 1400 can include a processor/storage module 1410, an array of communications transceivers (e.g., NFC transceiver 1420, BLE transceiver 1424, and/or RF/WiFi transceiver 1426), an ethernet interface 1478, a communications bus 1494, a relay output 1484 controlled by a relay controller 1482, touch interface 1499, and/or a power input 1454 regulated by power management module 1452. The processor/storage module 1410 can include instructions thereon that, when executed, cause it to perform the functions discussed throughout the present disclosure. For example, the processor/storage module 1410 can be configured to receive or transmit information via one of NFC transceiver 1420, BLE transceiver 1424, RF/WiFi transceiver 1426, and/or ethernet interface 1478. The processor/storage module 1410 can be configured to instruct relay controller 1482 to control a relay output 1484 to actuate a relay in another device. The processor/storage module 1410 can be configured to receive or transmit information via communications bus 1494, for example to tell an elevator which floors can be accessed. The processor/storage module 1410 can be configured to instruct power management module 1452 to control and/or monitor the power input 1454 and use thereof to power any of the elements in the smart access reader 1400. In some embodiments, the smart access reader 1400 can receive user input, such as a PIN or password, via a touch interface 1499 in communication with the processor/storage module 1410. The processor/storage module 1410 can process the received input, for example as described throughout the present disclosure.

With reference again to FIG. 1A, in some embodiments, an intercom 140 can be installed at one or more access points. Intercom 140 can be any type of intercom, including, but not limited to a virtual intercom or a smart intercom. Intercom 140 can monitor an access point, for example by providing audio and/or video monitoring, and provide remote access to monitoring data for security, authentication, or other purposes.

Figure 12:
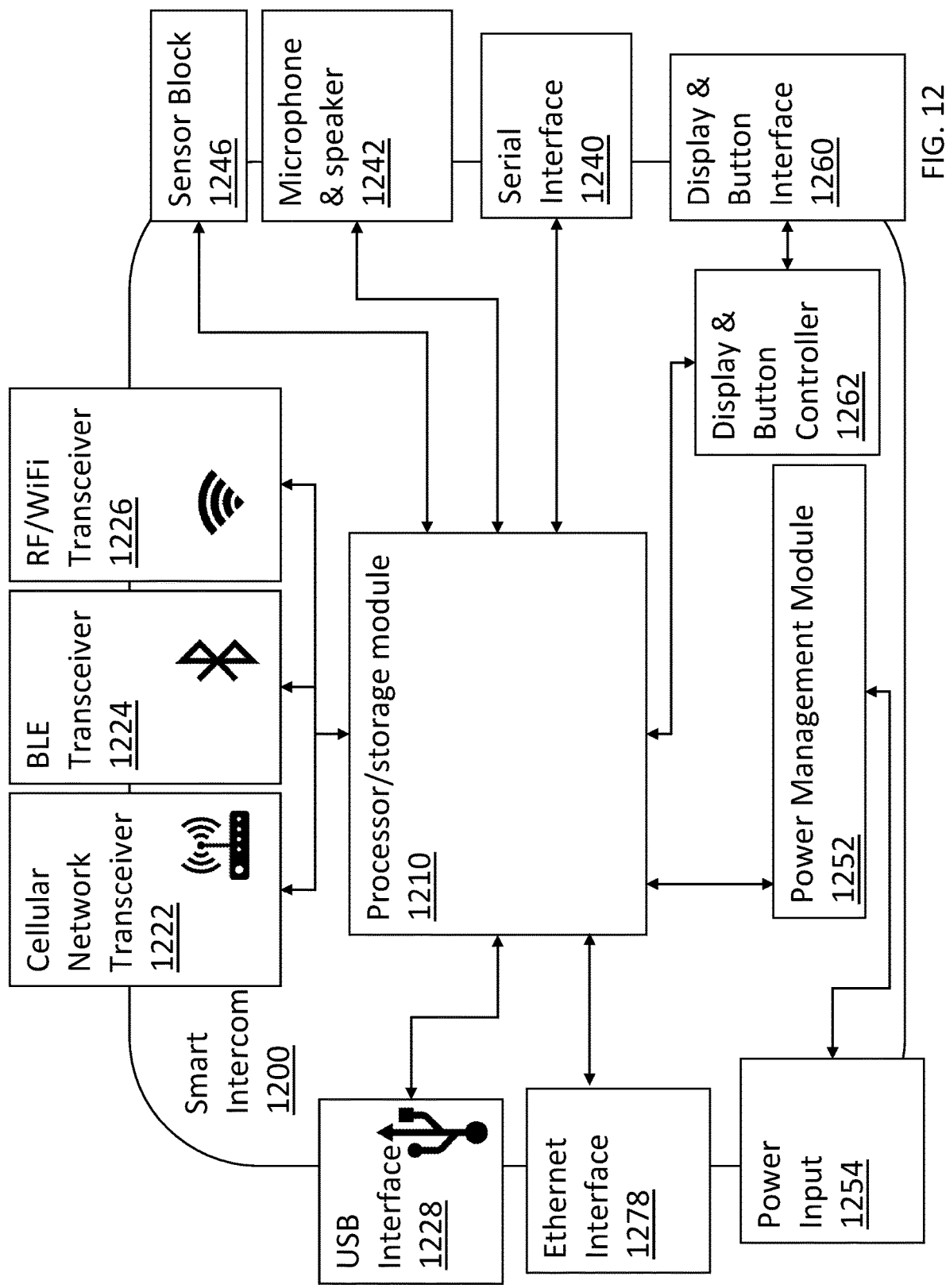
FIG. 12 is a block diagram of a smart intercom, according to some embodiments.

FIG. 12 is a block diagram of a smart intercom 1200, according to some embodiments. As shown in FIG. 12, the smart intercom 1200 can include a processor/storage module 1210, an array of communications transceivers (e.g., cellular network transceiver 1222, BLE transceiver 1224, RF/WiFi transceiver 1226), a USB interface 1228, an ethernet interface 1278, a power input 1254 regulated by power management module 1252, a sensor block 1246, a microphone and speaker 1242 (which may be separate elements), a serial interface 1240, and/or a display and button interface 1260 controllable by a display & button controller 1262. The processor/storage module 1210 can include instructions thereon that, when executed, cause it to perform the functions discussed throughout the present disclosure. For example, the processor/storage module 1210 can be configured to receive or transmit information via one of cellular network transceiver 1222, BLE transceiver 1224, RF/WiFi transceiver 1226, USB interface 1228, and/or ethernet interface 1278. The processor/storage module 1210 can be configured to receive user input via the display and button interface 1260 controllable by a display & button controller 1262. The processor/storage module 1210 can be configured to display information, images, or video via the display and button interface 1260 controllable by a display & button controller 1262. The processor/storage module 1210 can be configured to receive input via the serial interface 1240, such as image data from a camera. The processor/storage module 1210 can be configured to receive audio input via the microphone of the microphone and speaker 1242. The processor/storage module 1210 can be configured to cause the speaker of microphone and speaker 1242 to emit an audio signal. The processor/storage module 1210 can be configured to receive input from sensors of the sensor block 1246. The processor/storage module 1210 can be configured to instruct power management module 1252 to control and/or monitor the power input 1254 and use thereof to power any of the elements in the smart intercom 1200.

With reference again to FIG. 1A in some embodiments, the smart building system can include one or more monitoring devices 150 that monitor an access point or area associated with the smart building system. Monitoring devices 150 can be any type of monitoring device such as, but not limited to a camera (for capturing image or video data), a microphone (for capturing audio data), an infrared sensor, a motion sensor, a radar detector, water sensor (for leak detection), contact sensor (for sensing when doors or windows are opened, etc. As described in more detail throughout the present disclosure, monitoring device 150 can be used to compile additional data on access attempts. Furthermore, monitoring devices 150 implemented as radar detectors can be configured to monitor traffic patterns within a building In some embodiments a monitoring device 150 can be integral with an access control device, such as a smart lock with Bluetooth Low Energy (BLE) capabilities. For example, an integral radar sensor can detect moving objects and check for correlations with BLE proximity unlocking attempts. If an object is detected with no correlating unlocking attempt, an event can be logged (as described in more detail below) indicating a potential unauthorized access attempt. In some embodiments, a radar detector can further identify obstructions in proximity to the access control device that may interfere with a wireless signal to be emitted by the access control device, such as an RF or wireless signal. The access control device or device can then adjust the strength of the emitted wireless signal and/or notify an installer of the potential interference.

In some embodiments, a user can gain access to an access point and other elements in the smart building system by using one or more of a mobile device 160, an access card 165, or a door code. Mobile device 160 can receive one or more credentials from the cloud-based computing system 100 and provide the one or more credentials to an element in the smart building system in order to gain access. As described in more detail throughout the present disclosure, using the cloud-based computing system 100 to control credential generation for multiple components in the system, can provide a number of benefits. For example, when implemented in an apartment building, an apartment building manager can seamlessly control access to common areas in the apartment building, manage access to apartments and smart devices contained therein, monitor access throughout the apartment building including access to common or shared devices or areas for security purposes, monitor usage and problems with smart appliances, share management privileges or portions thereof with others using the smart building system (e.g., permit tenants to manage guest access), show available units to potential tenants without requiring a manager to be present, facilitate apartment turnover, facilitate maintenance or service provider access to particular areas and/or devices/appliances, etc. In addition, users of the smart building system, such as tenants, can use a single application on their mobile device to access their apartment, common areas, and shared smart devices; permit guest or service provider access to devices or areas, control and manage smart home devices, monitor smart home devices and areas to which the user has access, etc.

In some embodiments, one or more of the access technologies can also have backward compatibility with credentials that were not generated by the cloud-based computing system 100. For example, the NFC or RFID reader 130 or smart access control device 110 can be configured to accept a credential from an access card 165 that was previously used in a building before the smart building system was installed. For example, when installing a smart building system, an existing access control device can be replaced with a smart access control device as described in more detail in U.S. patent application Ser. No. 15/342,911 titled "Systems and methods for controlling access to physical space." An access card 165 used with the previous access reader can then be used with the smart access controller.

As shown in FIG. 1A, elements in the smart building system are communicating using various communication types in order to facilitate access to various areas and usage of various devices. For example, mobile device 160 can receive credentials for a particular access point, such as NFC or RFID reader 130 or access control device (smart lock) 110, from the cloud-based computing system 100 or by reading an RFID access card 165. Mobile device 160 or access card 165 can provide a credential to NFC or RFID reader 130 to gain access to an access point. For example, the NFC or RFID reader 130 may receive the credential and may provide the credential to the access control device 110 using, for example, a Wiegand code, which can then unlock an integral smart lock or instruct another access device 120 to provide access via another Wiegand code. The NFC or RFID reader 130 may provide the communicate with the access control device 110 via a wireless (WiFi, Bluetooth, NFC, etc.) and/or wired connection. While the present disclosure discusses the use of Wiegand codes for many different applications, other protocols, such as but not limited to IP, can be used in place thereof.

In another example, a mobile device 160 may present a credential directly to an access control device access control device 110 using, for example, Bluetooth, NFC, WiFi, cellular network communication (e.g., SMS), or other connection type or combination thereof. If the access control device access control device 110 is a smart lock, it can unlock the access point upon authenticating the valid credential. In some embodiments, the access control device access control device 110 instructs another access device 120, such as an elevator or garage door, to provide access to an access point, for example by transmitting a Wiegand code over a wired or wireless connection.

In another example, a user can provide access to an access point remotely. In some embodiments, the user can use a user mobile device 160 to request that access control device access control device 110 provide access, either by unlocking an integral electrically actuated lock or instructing an access device 120 to provide access. For example, a user can use an application or web terminal on the mobile device 160 to transmit to the cloud-based computing system 100 a request to provide access. The request can be transmitted over a WiFi, cellular network, or other type of connection or any combination thereof. The cloud 100 can then provide a valid credential to the access control device access control device 110, for example via a WiFi or cellular network connection or combination thereof, which will then provide access to the access point upon authenticating the valid credential. In some embodiments, the mobile device 160 can provide the credential directly to the access control device access control device 110 via a BLE, NFC, WiFi, cellular network, or other connection or combination thereof to provide access to the access point.

The smart building system can also facilitate requests for access, according to some embodiments. For example, a service provider or guest may arrive at the access point and request access via, for example, the intercom 140. Intercom 140 can collect and relay data, including video data, audio data, and user input relating to the request for access to the cloud-based computing system 100 via, for example, an ethernet, WiFi, cellular network, or other connection type or combination thereof for storage and/or transmission to the user mobile device 160. In some embodiments, the information can be relayed to a third party, such as a concierge, who can initiate a two-way video call with the visitor to welcome the visitor to the building or ask questions of the visitor to determine whether access should be granted. In some embodiments, the cloud-based computing system 100 and/or the intercom 140 can transmit at least some of the data to the user mobile device 160 to indicate that a guest has arrived at the building and is requesting access. In some embodiments, data is transmitted via a VOIP network 170 or VMS network 175. In some embodiments, the user can transmit video, audio, or other data from the user mobile device 160 to the intercom 140 via similar connections, such as WiFi, cellular network, VOIP network 170, VMS network 175, or any other type of connection type or combination thereof, which can be displayed to the guest. Data can optionally be stored on the cloud-based computing system 100. If the user wants to provide access to the guest, the user can request, via the user mobile device 160, either directly to the access control device 110, via the intercom's 140 connection to the access control device, or via the cloud-based computing system 100 to either the intercom or reader that the guest be provided access. In some embodiments, the user can request that the cloud-based computing system 100 provide a credential to the guest that can then be provided to the access control device 110 to gain access to the access point. In some embodiments, the requested credential can be transmitted to a mobile device of the guest. As described in more detail below, the guest credential can include additional credentials relating to other access points and devices in the building in order to enable the guest to fulfil the purpose of the visit. In some embodiments, data collected via an intercom 140 and/or user mobile device 160 can be provided to the management gateway 180, for example via VMS network 175 or through the cloud-based computing system 100.

In some embodiments, the intercom 140 can be a virtual intercom 140. The virtual intercom can be implemented as a QR code or another indication or coded link, on a user mobile device 160 (e.g., a guest's mobile device), or method for accessing a virtual intercom interface on the web or through an application on the user mobile device 160. In some embodiments, the guest simply looks up a virtual intercom on a mobile application or website by entering in the address of the building. Once the guest's user mobile device 160 has accessed the virtual intercom interface, the guest can contact the recipient (e.g., an occupant of the building associated with the virtual intercom 140) via a plurality of methods, including, but not limited to, placing an IP call (e.g., using audio or video), sending a text message to the recipient, POTS call, or otherwise notifying the recipient that the guest is seeking access to the access point.

In some embodiments, monitoring device 150 in the smart building system can provide data to one or more of the cloud-based computing system 100, the management gateway 180, and the user mobile device 160. As shown in FIG. 1A, in some embodiments this information can be provided via a connection such as VMS network 175, Bluetooth, WiFi, or Zigbee, either directly to the management gateway 180 or user mobile device 160, or to the cloud-based computing system 100. The user or manager may access data stored on the cloud-based computing system 100 in accordance with permissions. For example, if a monitoring device 150 is installed in a user's apartment, only the user may be able to gain access. The user can then have the option of permitting access to the manager for the data in the event of a suspected break-in or other emergency. Similarly, in some embodiments the manager is the only entity permitted to access data in the cloud-based computing system 100 from a monitoring device 150 installed in a common area of the building. In some embodiments, the cloud-based computing system 100 can be configured to give a tenant access to monitoring data under certain limited conditions, such as when the user has recently permitted guest access or when there is a suspected break-in.

In some embodiments, the smart building system can include one or more smart devices 195. Smart devices can include, but are not limited to, smart thermostats, smart outlets, smart home appliances, smart speakers, smart exercise equipment, smart leak detectors, smart shades, etc. Smart devices can interface with other elements in the smart building system, such as a smart hub 190, to receive commands or data, transmit data, receive information about user preferences, etc. As described in more detail below, smart devices 195 can be associated with a particular area within the smart building system. For example, a credential generated by the cloud-based computing system 100 can be used to determine access to the smart devices 195, and/or to determine which users have permissions to control particular settings or attributes of the smart devices 195. In some embodiments, the access control device 110, such as a smart door lock, can perform both the functions of the access control device 110 and smart hub 190. In some embodiments, credentials are broken down into a sub-unit level. For example, in a shared dorm room, all residents may have access to a common smart thermostat, while only some may have access to smart lights in each respective dorm room.

Figure 13:
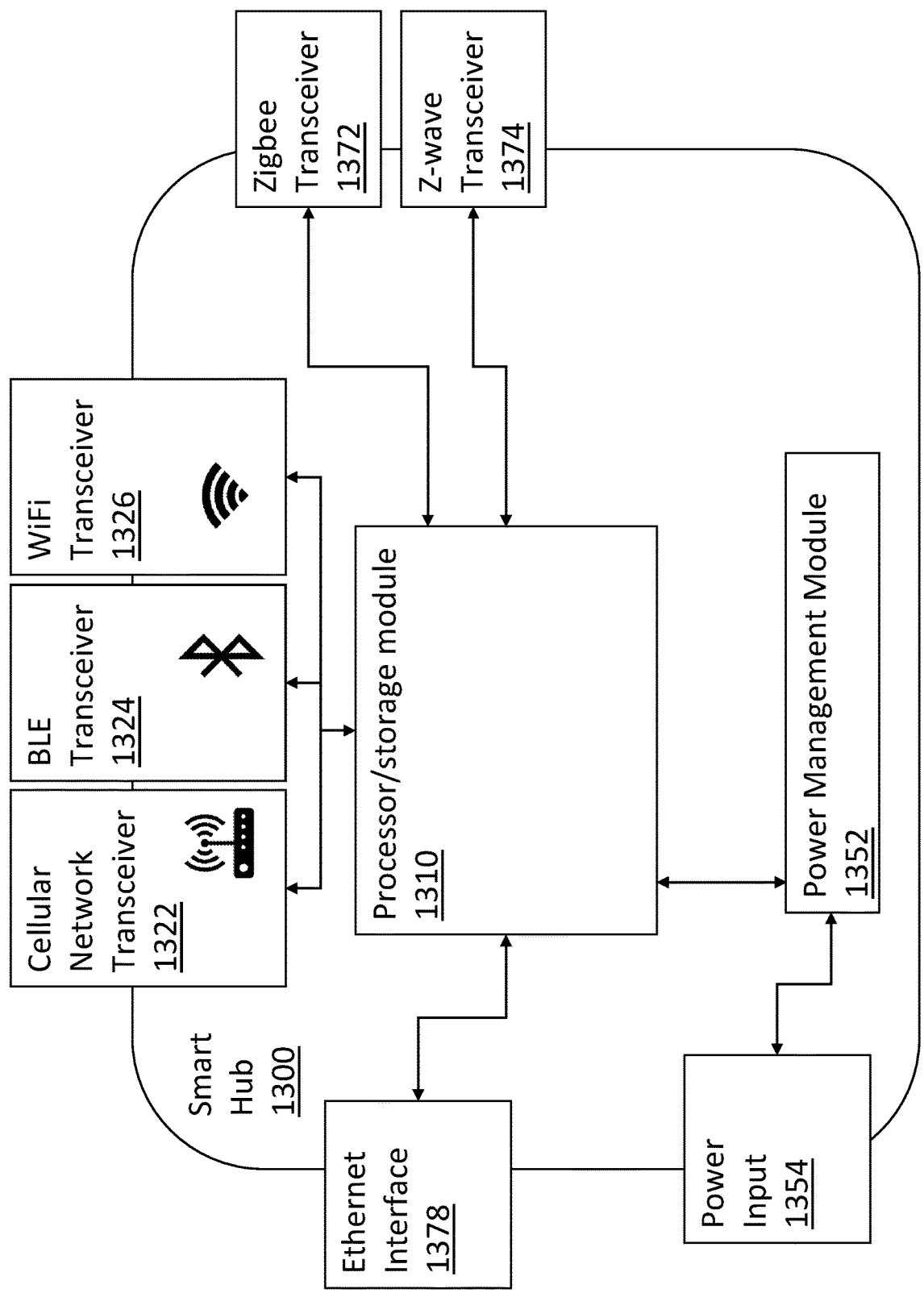
FIG. 13 is a block diagram of a smart hub, according to some embodiments.

FIG. 13 is a block diagram of a smart hub 1300, according to some embodiments. As shown in FIG. 13, the smart hub 1300 can include a processor/storage module 1310, an array of transceivers (e.g., cellular network transceiver 1322, BLE transceiver 1324, WiFi transceiver 1326, Zigbee transceiver 1372, Z-wave transceiver 1374), an ethernet interface 1378, and/or a power input 1354 regulated by power management module 1352. The processor/storage module 1310 can include instructions thereon that, when executed, cause it to perform the functions discussed throughout the present disclosure. For example, the processor/storage module 1310 can be configured to receive or transmit information via one of cellular network transceiver 1322, BLE transceiver 1324, RF/WiFi transceiver 1326, USB interface 1328, ethernet interface 1378, Zigbee transceiver 1372, and/or Z-wave transceiver 1374. The processor/storage module 1210 can be configured to instruct power management module 1352 to control and/or monitor the power input 1354 and use thereof to power any of the elements in the smart hub 1300.

With reference again to FIG. 1A, in some embodiments, the third-party cloud-based computing system 101 can be associated with a third party that sells, manufactures, or is otherwise associated with one or more particular smart devices 195 or access control devices 110 (e.g., smart locks). As described in more detail below, the third-party cloud-based computing system 101 can be involved in gaining access to or otherwise controlling smart devices 195. Third-party cloud-based computing system 101 can communicate with different elements in the smart building system such as, but not limited to the mobile device 160 and/or the cloud-based computing system 100. In some embodiments, the third-party cloud-based computing system 101 can communicate with the mobile device 160, the cloud-based computing system 100, an smart device 195, an access control device 110, or any combination thereof via, for example, a wireless or wired internet connection or a cellular network. access control device In some embodiments, particular areas, such as, but not limited to apartments, can be associated in the cloud-based computing system 100 with a smart hub 190 or access control device 110 associated with and/or integrated with the smart hub 190. Associating Smart hubs with particular areas, such as apartments, can streamline smart building management, monitoring, and access functions. For example, when a user or manager requests (e.g., via user mobile device 160 or management gateway 180) that cloud-based computing system 100 provide to a user access credentials to an area, such as, but not limited to a guest, service provider, new tenant, the user or manager can also request cloud-based computing system 100 to coordinate credentialing for smart devices 195 associated with the area. The smart hub 190 or access control device 110 can communicate wirelessly (for example, over Bluetooth, a wireless network, Zigbee, or a cellular network) with the smart devices 195. In some embodiments, smart hub 190 or access control device 110 can serve as a WiFi hotspot that provides local area WiFi networking for the area (e.g., apartment or common space) by broadcasting an internet connection received via an ethernet, WiFi, or cellular connection. In some embodiments, communications between the smart device 195 and the smart hub 190 or access control device 110 can include, but are not limited to providing commands, providing software updates, providing settings changes, transmitting data, etc. Communications can be sent using a variety of formats or standards, including, but not limited to Zigbee or Bluetooth. The smart hub 190 or access control device 110 can communicate with the cloud-based computing system 100 to receive or transmit communications, or directly with the user mobile device 160. In some embodiments, the smart home devices 195 can communicate directly with cloud-based computing system 100, for example via a WiFi, a cellular network, or any other communication type. In some embodiments, a beacon 196 can be associated with a smart home device 195. As described in more detail below, the beacon 196 can contain information to assist with gaining access to or controlling the smart home device 195. In some embodiments, the beacon 196 can be a near field communication (NFC) tag, a QR code, BLE device identifier, RFID tag, or other physical beacon (e.g., an image with encoded data or an audio beacon broadcasting a link via audible or ultrasonic code) that allows for encoding a link to tell the system what action to perform.

In some embodiments, when a manager or user requests that a guest receive temporary access to one or more access points in the building, because the cloud-based computing system 100 is responsible for all credentialing across the smart building system, the manager or user can more easily provide appropriate credentials for all access points and devices related to that guest's visit. For example, when a tenant requires service from a third party, such as a technician for a broken heating system, the tenant can request that the cloud-based computing system 100 provide credentials to the technician that allow for access to any access point leading up to the tenants apartment, the access point to the tenants apartment, and to change settings on the smart thermostat that controls the broken heating system all from one application on the user mobile device 160 of the technician, and without requiring the technician to seek separate credentials relating to each access point or smart device involved in the visit. Further, where time-limited credentials are used, each credential can be coordinated on the same time frame and in a way that works together (e.g., the credential for changing settings on the smart thermostat is only valid after use of a credential to enter the apartment) to increase security, ease of access, etc. In another example, when a tenant moves out of an apartment, a building manager can easily instruct cloud-based computing system 100 to transfer privileges to a new tenant, including privileges to access an access control reader 110 such as a smart lock, and all associated smart home devices including fixtures like smart appliances, smart thermostats, etc. In some embodiments, by using the same credentials across the entire system, building managers can more easily manage their buildings. In some embodiments, by using the same credentials across the entire system, users of the system can more easily share access to their properties and/or devices to guests, such as friends or those visiting for a short-stay accommodation. Users can gain, grant, and exercise access to multiple different locations using the same interface. Smart home control permissions can also automatically and/or temporarily transfer from a host to a guest in a short-stay accommodation, preserving the Guest's privacy and security without granting carte blanche access by the host.

In some embodiments, security measures are put in place whenever a credential is transmitted from one element to another. For example, transport of credentials over a public network can be conducted using a transport layer security (TLS) protocol, or equivalent protocol.

In some embodiments, an exception can be made for BLE transfers (or Zigbee, Z-wave, NFC) executed for unlocking events. In some embodiments, all credentials stored on mobile devices and/or in other elements are stored in an encrypted state. When in use (e.g., when transmitted for validation) other encryption and security techniques can be used.

Figure 1B:
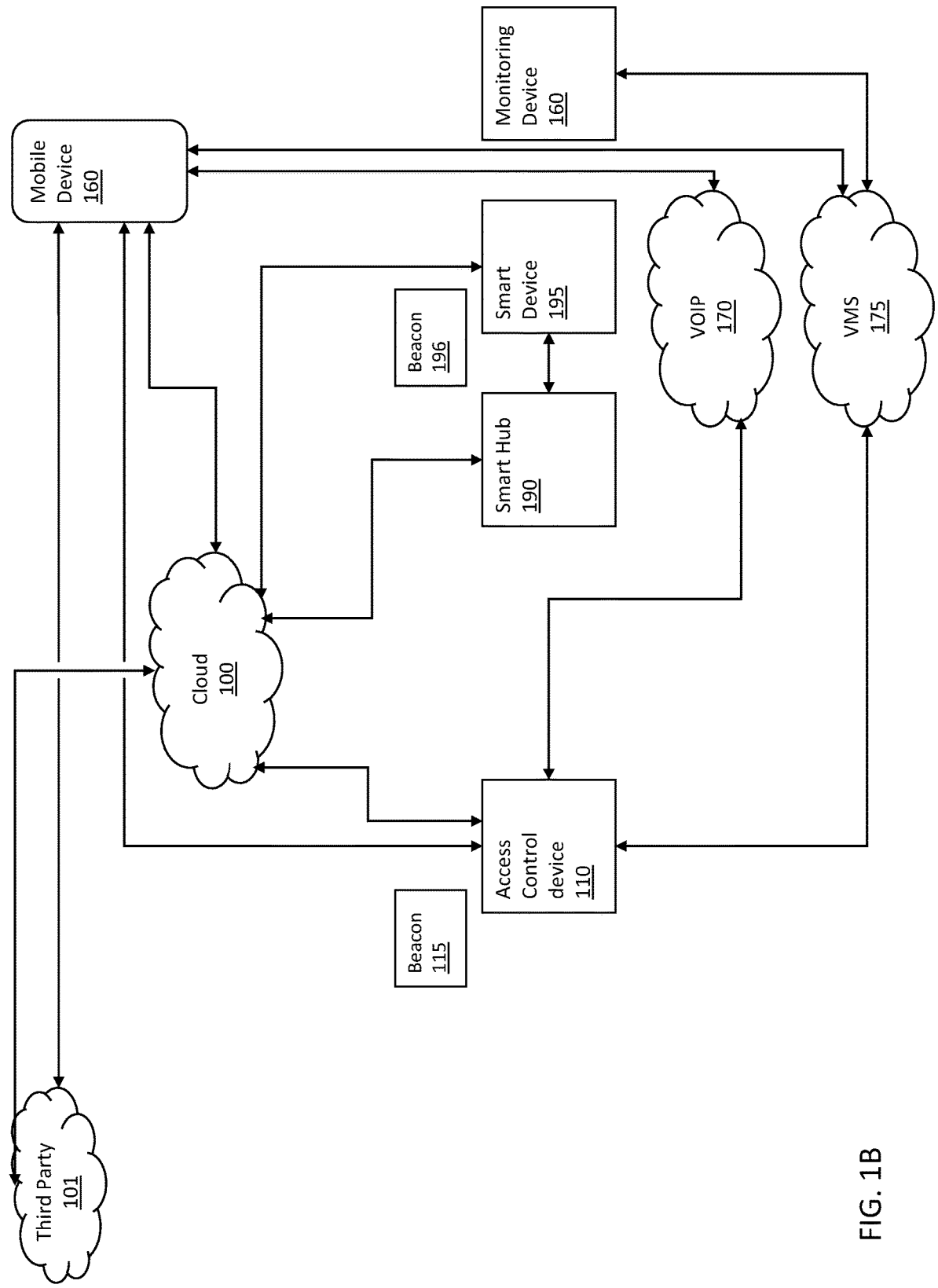

FIG. 1B is a diagram showing a system architecture for an individual smart home system, according to some embodiments. As shown in FIG. 1B, a smart home system can include similar elements to the smart building system and operate similarly to the operation described above. In some embodiments, the functionality of intercom 140 can be transferred to the access control device 110, which can, for example, record video or audio of a guest at an access point and provide such data to the cloud-based computing system 100 and/or the user mobile device 160 in order to determine whether to grant access to the guest and/or for security purposes. Access control device 110, such as a smart lock, can still act as a smart home hub, thereby facilitating access to other connected devices in the individual smart home system and provisioning of access to guests and service providers, lessees, or new owners after sale of the home.

In some embodiments, both individual smart home systems (e.g., that shown in FIG. 1B) and smart building systems (e.g., that shown in FIG. 1A) can interface with the same cloud-based computing system 100. Accordingly, users and managers can easily gain and transfer access to both access points and associated smart devices.

Figure 2:
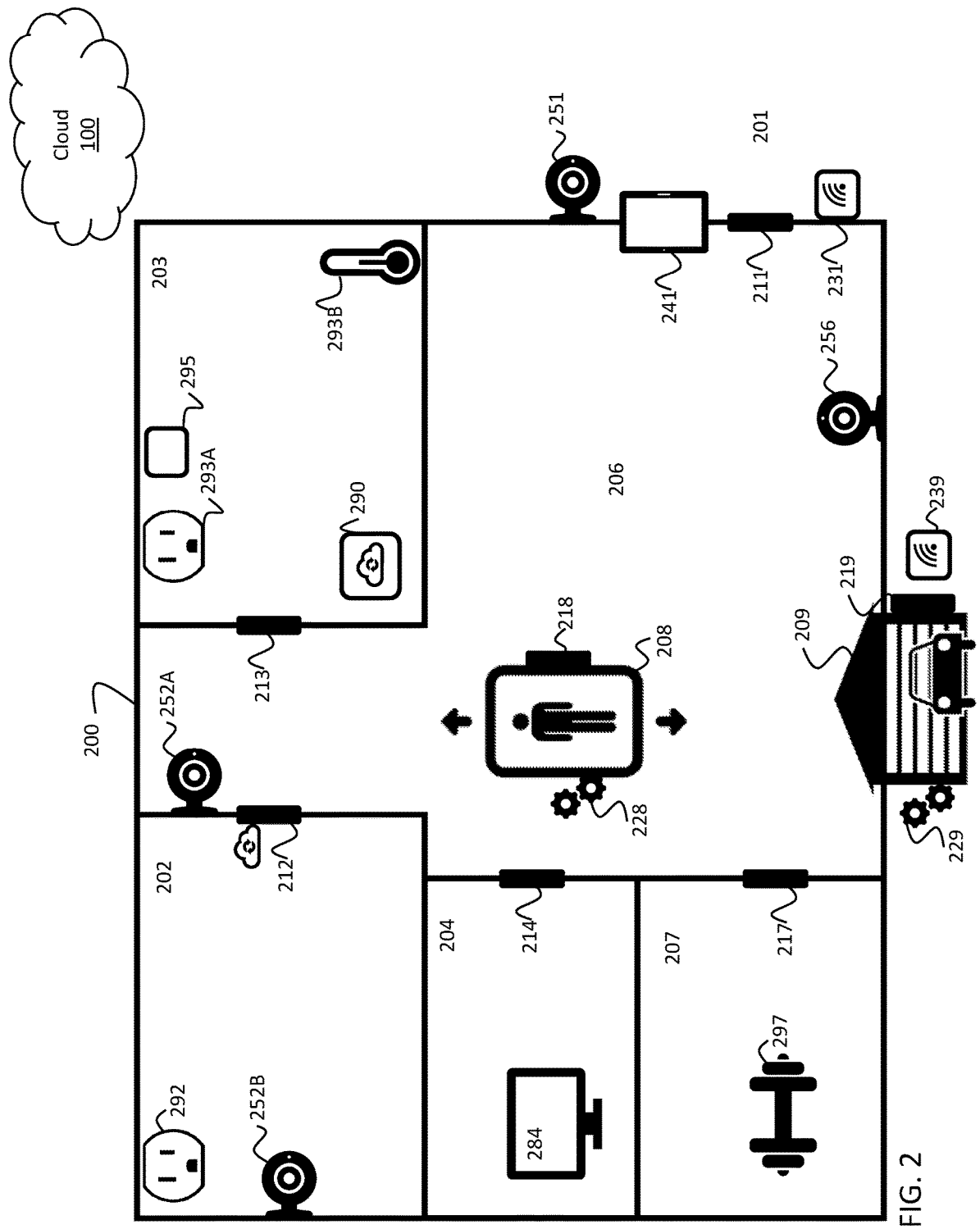
FIG. 2 is a diagram showing an example implementation of a smart building system, according to some embodiments.

FIG. 2 is a diagram showing an example implementation of a smart building system, according to some embodiments. While the elements in FIG. 2 are discussed in relation to an implementation in an apartment building, a person of ordinary skill in the art would understand from the present disclosure that a smart building system can be implemented in any type or types of building, such as, but not limited to office buildings, single-resident buildings, hotels, governmental buildings, academic buildings, dormitories, transportation buildings (e.g., airports or bus stations), etc.

As shown in the example of FIG. 2, in some embodiments, the smart building system is installed in an apartment building 200 having one or more areas such as, but not limited to, an entry point (main entrance) 201, a garage entrance 209, a common area 206, a restricted common area 207, an elevator 208, a management area 204, and one or more residences 202, 203. As shown in FIG. 2, each of the entry point 201, restricted common area 207 (such as a gym), a management area 204, elevator 208, garage entrance 209, and residences 202, 203 have an access point (such as, but not limited to, a door or turnstile) equipped with access control devices 211, 217, 214, 218, 219, 212, and 213, respectively. The access control devices 211, 217, 214, 218, 219, 212, and 213 can be any type of device that receives an input credential and assists in determining whether the input credential is authorized for the access point with which the access control device is associated. For example, one or more of the access control devices 211, 217, 214, 218, 219, 212, or 213 can be a smart lock. The credential can be read or received through one or more different types of technologies, such as, but not limited to a card reader, an RFID sensor, a touchscreen for receiving an alphanumeric credential, a Bluetooth or wireless interface, etc. In some embodiments, one or more of the access control devices 211, 217, 214, 218, 219, 212, or 213 can be integral with a smart lock, such as one of the smart locks described in U.S. patent application Ser. No. 14/589,805 filed on Jan. 5, 2015 titled "Methods and systems for multi-unit real estate management." In some embodiments, the one or more of access control devices 211, 217, 214, 218, 219, 212, or 213 can communicate with a separate access device, such as an elevator control panel 228 or garage door opener 229. In some embodiments, one or more of the access control devices 211, 217, 214, 212, 218, 219, or 213 can be separate from a reading device, such as an RFID reader 231 or 239 or from an associated locking or actuatable device, such as a lock, a garage door opener 229.

In some embodiments, one or more of the access control devices 211, 217, 214, 212, or 213 can have storage thereon to store data, such as, but not limited to a list of valid access credentials, an access log containing a list of credentials or users who accessed or attempted to access the access point with which the smart lock is associated optionally in combination with a timestamp and/or a photo taken at the time of access, codes (such as, but not limited to Wiegand codes or IP) for instructing an associated access device (such as, but not limited to, an electrically actuated lock) to allow access to, for example the access point or a particular floor accessible by an elevator.

As shown in FIG. 2, in some embodiments, one or more of the access points and the areas can include a monitoring device, such as monitoring devices 251, 256, 252A, and 252B. Monitoring devices 251, 256, 252A, and 252B can be, for example, video cameras, motion sensors, flood sensors, infrared sensors, or any other devices configured to monitor an area. Some of monitoring devices 251, 256, 252A, and 252B can be associated with an access control device, such as the monitoring devices 252A and 251 located in proximity to access control devices 212 and 211, respectively. Other of monitoring devices 251, 256, 252A, and 252B can be associated with an area, such as the monitoring devices 252B and 256 which are associated with apartment 202 and common area 206, respectively.

As shown in FIG. 2, in some embodiments, the building 200 can further include additional access points, such as a garage entrance 209 or an elevator 208. Each of the garage entrance 209 and the elevator 208 can include a device for receiving access credentials. For example, elevator 208 is associated with an elevator control panel 228, such as an elevator control panel. The elevator control panel 228 can receive an access credential from a user, for example using any of the technologies described above such as the access control device 218 and provide a signal to the elevator to permit access when the credential is authorized. In some embodiments, as described in more detail below, access can be limited to particular floors accessible by the elevator. Access control reader 218 can therefore provide the elevator control panel 228 of the elevator 208 with, for example, information about which floors are to be accessed using, for example, Wigand codes or another type of communication. Similarly, garage entrance 209 can include a garage door opener 229, which can, for example, receive communications from an access control device 219 connected to an RFID reader 239. When the correct credential or credentials are provided to the RFID reader 239, access control device 219, and a garage door opener 229 that can open the garage door or garage gate. In some embodiments, garage door opener 229 can receive instructions to open the garage door from access control device 219 via, for example, Wiegand codes provisioned in the access control device 219.

As shown in FIG. 2, in some embodiments, areas in the building 200 can house additional smart devices connected to the smart building system, such as, but not limited to smart exercise equipment 297 in the gym 207, manager access device 284, smart outlets 292, 293A, smart thermostat 293B, etc. For example, in some embodiments, smart exercise equipment 297 can provide data gathering functions (e.g., heart rate monitoring) that can then be uploaded to a remote server or user device for analytics. In some embodiments, smart exercise equipment 297 can communicate with a remote server to receive customized workout plans, such as an elevation map for an indoor stationary bicycle. Smart outlets 292, 293A can provide functionalities beyond typical outlets, which can include, but are not limited to voice command capabilities, remote control or remote scheduling via a web interface or API, power usage monitoring, uploading gathered data to a local or remote database, etc. Smart thermostat 293B can control the climate (e.g., via heat, air conditioning, and/or humidifier control) of the apartment 203. Smart thermostat 293B can provide various smart functionalities such as, but not limited to, remote control or scheduling via a web interface or API, temperature monitoring, uploading gathered data to a local or remote database, etc. In some embodiments, smart thermostat 293B can receive information from cloud-based computing system 100 about user preferences for users known to be within or to otherwise occupy the apartment 203 and control the climate of apartment 203 based on such information. As described in more detail below, access to or management of the smart exercise equipment 297 in the gym 207, manager access device 284, smart outlets 292, 293A, and smart thermostat 293B can be governed by access credentials generated by the cloud-based computing system 100.

In some embodiments, a user in one of the apartments can use a third-party smart device to interact with other parts of the system. For example, a user may instruct a smart speaker to turn on a light associated with smart outlet 292 or 293A. The smart speaker can contact a third-party cloud service, which can be provisioned to send the command to the cloud-based computing system 100. The cloud-based computing system 100 can then send a command with an associated credential to a local smart hub, such as the access reader 212, e.g., access control device, or smart hub 290 which can then send an instruction to a local device, such as smart outlet 292 or 293A respectively to turn on.

In some embodiments, a user can use the smart hub 290 to access a device without using the Internet, thereby bypassing the cloud-based computing system 100. For example, a user can connect directly to the smart hub 290 (for example using a Bluetooth or WiFi connection) and send an instruction relating to a device to the hub 290 (for example, also using a credential). The smart hub 290 can then direct the instruction directly to the smart device, such as a smart lock or smart outlet 293A. In some embodiments, the smart hub functionality may be implemented in an access control device, such as a smart lock, and the access control device can control smart devices.

In some embodiments, one or more of smart exercise equipment 297 in the gym 207, manager access device 284, smart outlets 292, 293A, smart thermostat 293B can connect to other devices or networks via a connectivity technologies such as, but not limited to WiFi, Bluetooth wired connections, cellular network connectivity, etc. In some embodiments, one or more of smart exercise equipment 297 in the gym 207, manager access device 284, smart outlets 292, 293A, smart thermostat 293B can connect to a smart hub, such as smart hub 290 in apartment 203 or smart access device 212 in apartment 202 that can act as an all-in-one smart access reader, smart lock, and smart hub. Smart devices can connect to smart hubs to receive commands, software updates, receive or transmit data, internet connectivity, etc. and to relay information to the cloud-based computing system 100 or other devices such as a user mobile device or management gateway. As described throughout the present disclosure, by integrating credentialing for both the access control devices 211, 217, 214, 218, 219, 212, or 213 with the system for connecting to, using, and managing smart home devices, the smart building system can simplify the access, usage, and management functions associated with such systems.

In some embodiments, smart home devices can be associated with a beacon, such as the beacon 295 associated with smart outlet 293A. As described in more detail with reference to FIGS. 8-10, beacon 295 can be used to assist with accessing or controlling the smart outlet 293A. In some embodiments, additional beacons can be provided to assist with access to other devices in the system of FIG. 2, such as access points, elevators, etc. In some embodiments, beacon 295 can be an unpowered device that can be read by, for example, a user's mobile device.

As shown in FIG. 2, in some embodiments an intercom 241 can be installed at an access point 201 of the building 200. Intercom 241 can possess the same capabilities and connectivity as intercom 140 discussed with reference to FIG. 1A. In some embodiments intercom 240 is a virtual intercom or can be integrated with the access control device 211.

In some embodiments, Intercom 241 can be connected to the cloud-based computing system 100. In such embodiments, the intercom 241 can automatically be updated whenever a tenant moves into the building 200. Similarly, intercom 241 can be automatically configured to send notifications to a new tenant without having to manually alter or reconfigure the intercom 241. In some embodiments, the intercom 241 can have a voice activation feature. For example, a voice activation feature can receive a user command to access a particular apartment or visit a particular resident and process the command, either remotely on the cloud-based computing node or locally by the intercom 241. The voice activation can then, based on the command, identify the access point or resident, and make a call to the resident's mobile device or a smart speaker associated with the resident. In some embodiments, each resident can gain access, for example using a credential from cloud-based computing system 100, to configure the intercom 241. For example, the resident can configure the name that appears on a user interface of the intercom, what action should be taken when someone tries to reach that resident via the intercom (e.g., whether to send an alert or call to the resident's mobile device, a connected smart speaker in the user's residence, initiate a video call with a concierge, etc.), etc. In some embodiments, when intercom 241 connects to a smart speaker of the resident, the resident can then use the smart speaker to unlock the access point associated with the intercom 241, for example, by sending a credential thereto.

In some embodiments, integrating access control and smart device management into a single system allows for additional functionality. For example, the cloud-based computing system 100 can be configured to receive event data from smart devices, such as a smart leak sensor, and notify both a tenant and management when a leak is detected. A tenant can then authorize management to access the apartment in order to inspect the problem. Furthermore, a tenant can restrict access to smart devices when a guest is using or is otherwise authorized to use an area. For example, a tenant can power down particular smart devices such as smart speakers, etc. when a service provider is present to prevent the service provider from using smart devices. In some embodiments, a user can configure particular smart device behaviors when a door is unlocked. For example, smart lights can be automatically turned on whenever a particular user gains access to an access point at the front door to their apartment. All of these functions can be implemented into a single application on the user's mobile device to simplify management and usage and/or improve overall security of the system.

FIGS. 3A-3D are diagrams representing various credentials generated by a cloud-based computing system 100, such as the cloud-based computing system 100 in FIG. 1A, 1B, or 1C, according to some embodiments. The credentials shown in FIGS. 3A-3D are merely illustrate examples, and a person of skill in the art would understand from the present disclosure that other credential formats are contemplated. Although the use and operation of the example credentials in FIGS. 3A-3D is described with reference to FIG. 2, a person of skill in the art would understand from the present disclosure that the same or similar credentials in accordance with the present disclosure would be operable in many different smart building or home applications.

Figure 3A:
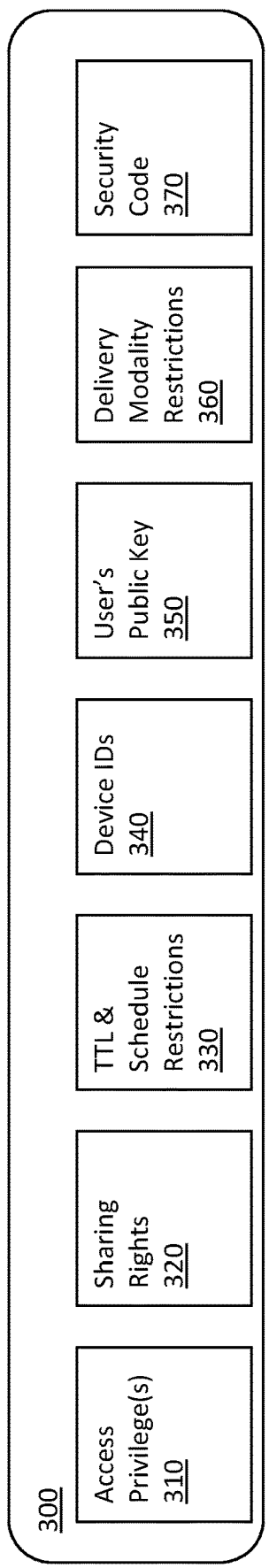
FIGS. 3A-3D are diagrams representing the contents of credentials, according to some embodiments.

FIG. 3A is a diagram representing the contents of a generic credential 300 provided to a user mobile device from a cloud-based computing system 100, according to some embodiments. As shown in FIG. 3A, a generic credential 300 can include separate fields containing information about one or more of access privileges 310, sharing rights 320, time-to-live (TTL) and/or scheduling restrictions 330, device IDs 340, the credential user's public key 350, delivery modality restrictions 360, or security code 370.

Access privileges 310 can include a listing or representation of one or more particular access types, which can include, but are not limited to unlocking or otherwise receiving access from an access control device (e.g., access control devices 211, 217, 214, 218, 219, 212, and 213); keeping a door unlocked; setting up a smart device (e.g., smart devices 292, 293A, 293B, 297, or monitoring devices 252A, 256, 251) and/or pairing it to a particular smart hub (e.g., 212 or 290); updating a settings or a subset of settings on an access control device, smart device, or monitoring device (e.g., access control devices 211, 217, 214, 218, 219, 212, 213, smart devices 292, 293A, 293B, 297, or monitoring devices 252A, 256, 251); performing a firmware update on a device (e.g., access control devices 211, 217, 214, 218, 219, 212, 213, smart devices 292, 293A, 293B, 297, or monitoring devices 252A, 256, 251); controlling a smart device (e.g., smart devices 292, 293A, 293B, 297); receiving or providing information to a monitoring device or intercom (e.g., monitoring devices 252A, 256, 251 or intercom 241), etc.

Sharing rights 320 can indicate whether the user of the credential 300 is authorized to share the credential 300, and what form that sharing can take (e.g., universal sharing to any user of the system, sharing in accordance with certain restrictions such as during particular hours or to certain subsets of users, etc.).

TTL and/or scheduling restrictions 330 indicate the time before the credential 300 expires and/or the times during which the credential can be used before expiration (e.g., expires in 1 week and can be used from 9 am to 5 pm).

Device IDs 340 can include a listing or representation of the device IDs of system elements for which the credential is valid (e.g., IDs for access control devices 211, 217, 214, 218, 219, 212, 213, smart devices 292, 293A, 293B, 297, or monitoring devices 252A, 256, 251). In some embodiments, each device ID is a unique universal identifier (UUID).

User's public key 350 can be a public key associated with a private key of the user of the credential and/or the user's mobile device. As described in more detail below, the user's private key associated with the user's public key 350 can be used to encrypt a NONCE received from a device (e.g., a smart access reader or a smart device), which can be provided to a device in order to gain access. A device can then decrypt the NONCE with the public key to determine whether the user is authorized.

Delivery modality restrictions 360 can be a listing or indication of any restrictions on how a credential can be delivered to a device for authentication. For example, delivery modality restrictions may restrict delivery of a credential or information based on the credential to be delivered only via BLE, or another type of communication type.

Security code 370 can be any type of security code, for example a certificate signed from a granting authority (e.g., the cloud-based computing node) recognizable by the receiving device (e.g., an access control device or smart device).

Figure 4A:
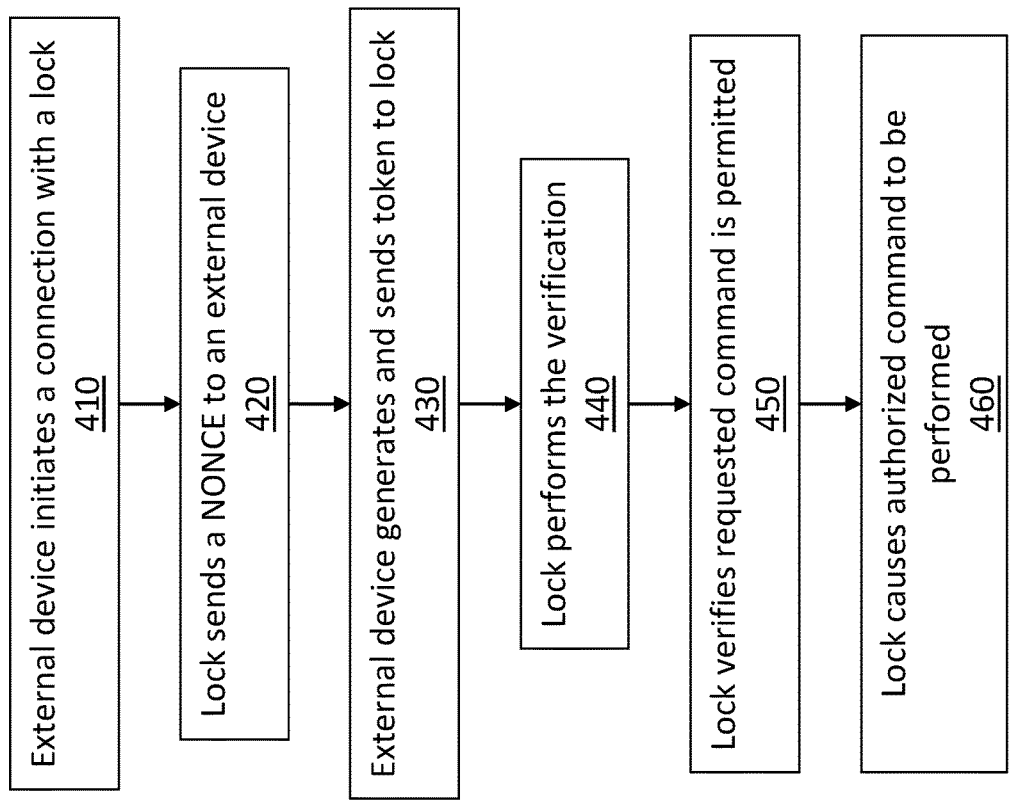
FIGS. 4A-4B show a credential verification process and token for the same, according to some embodiments.

FIG. 4A is a flow diagram showing a user authentication process for using a credential such as credential 300, according to some embodiments. The credential verification process begins at step 410, where an external device, such as a user's mobile device establishes a connection with a lock. Although FIG. 4 refers to processes involving a lock, a person of skill in the art would understand from the present disclosure that other devices can be used, such as, but not limited to, access control devices, smart hubs, smart devices, etc.

After the external device initiates connection with the lock in step 410, the lock can send a NONCE to the external device in step 420. The NONCE can be any type of NONCE, and can be stored by the lock for use later in the authentication process and for logging purposes.

In step 430, after receiving the NONCE, the external device generates and sends a token to the lock. The token can be generated using the NONCE received in the step 420, information contained on the external device, and/or any other information accessible by the external device such as information requested or received from the cloud-based computing system 100 or other information received from the lock. In some embodiments the NONCE is sent to the external device in a BLE communication, or any other type of communication.

Figure 3B:
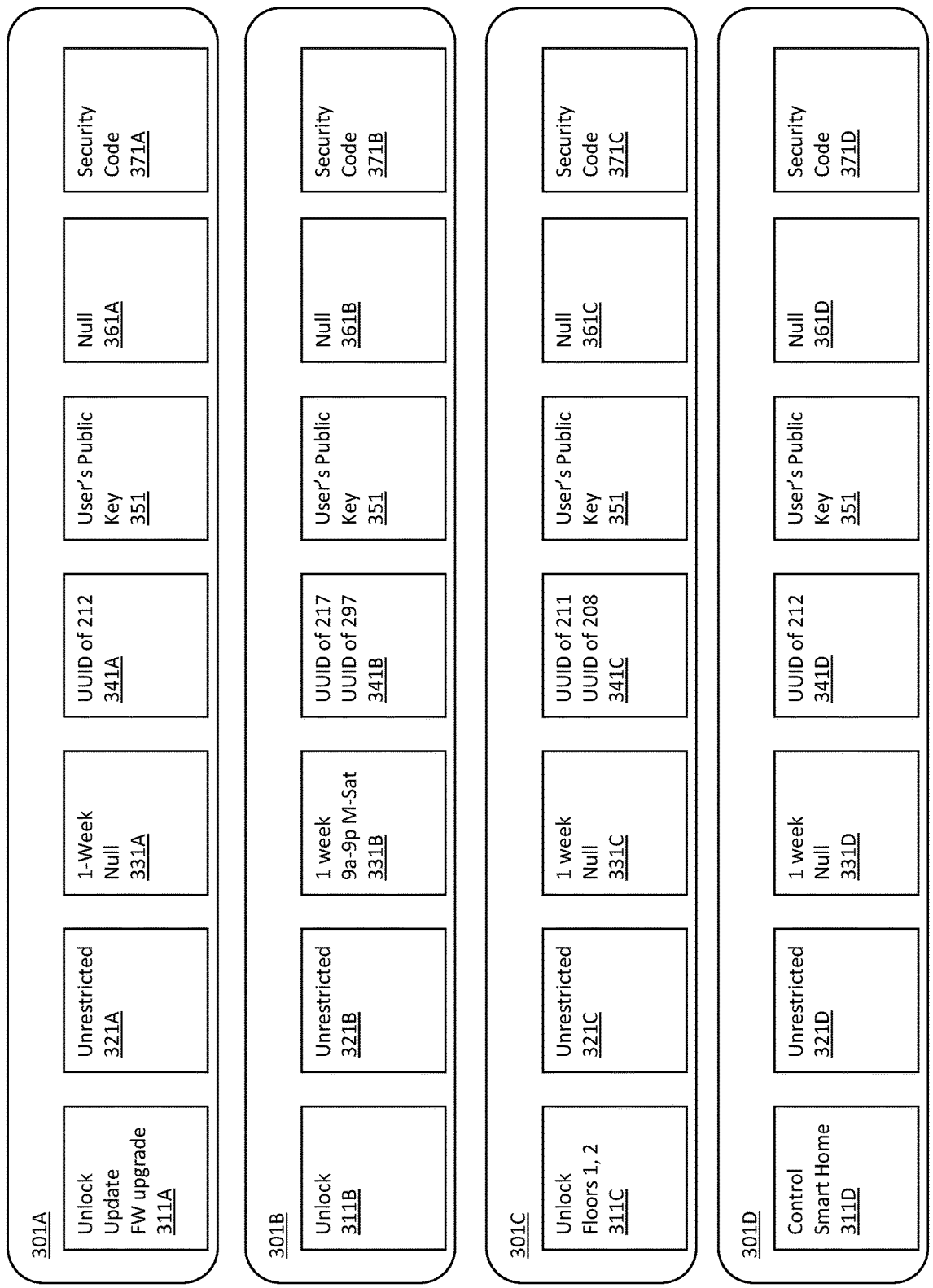
Figure 3C:
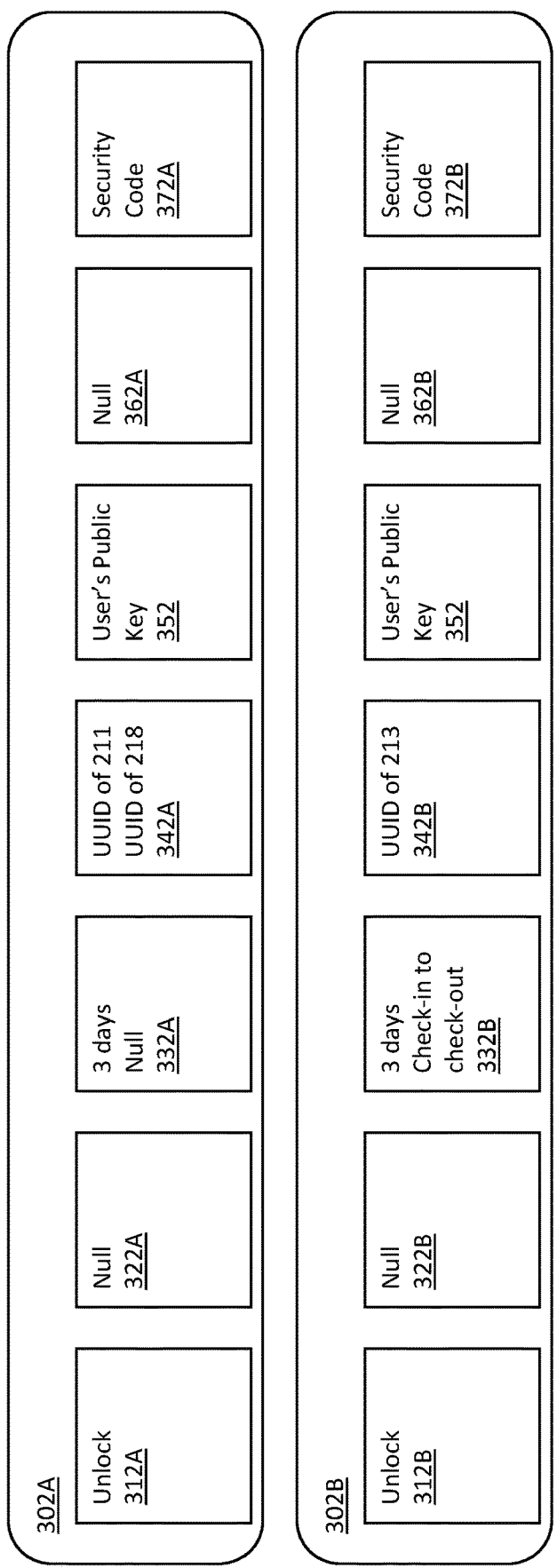
Figure 3D:
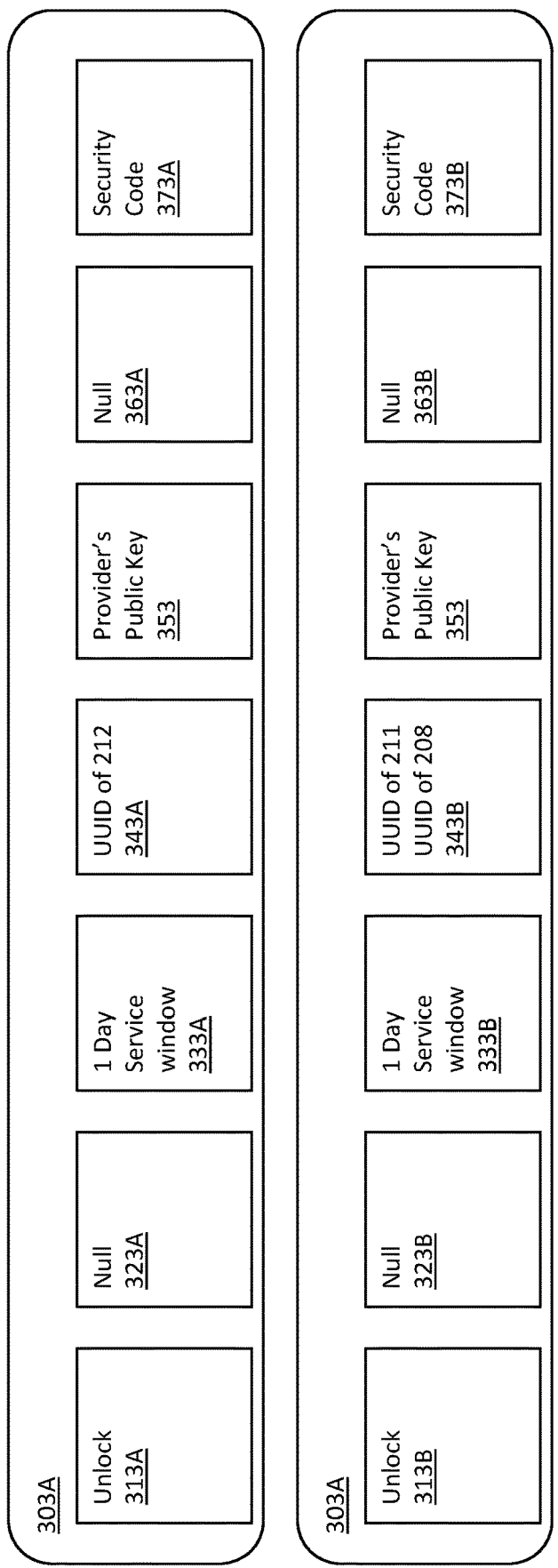
Figure 4B:
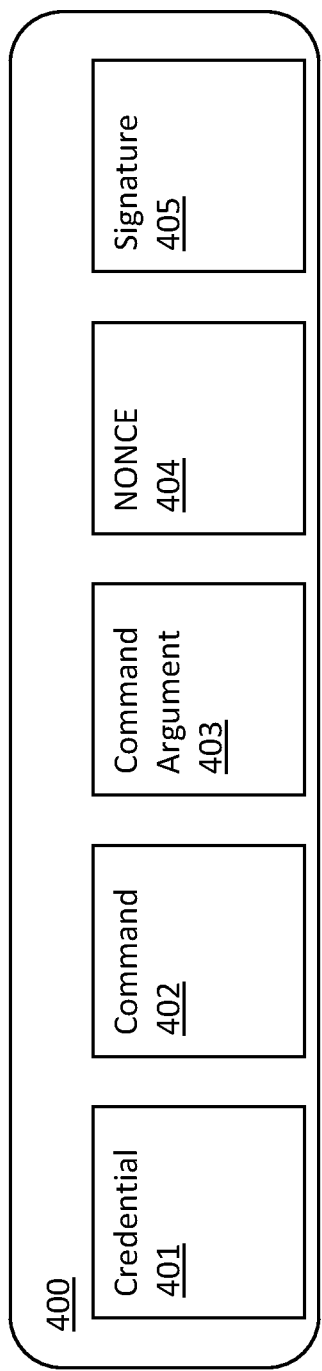

FIG. 4B shows an example token 400, according to some embodiments. The Token can include at least one credential 300 retrieved from memory, such as the credential 300 described with reference to FIG. 3; a command 402, such as a command to unlock, stay unlocked, etc.; a command argument 403, such as a time period for a device to stay unlocked; a NONCE 404 received from a lock or other device to which the token bearer is attempting to gain access; and a signature 405. In some embodiments, the command 402 and command argument 403 correspond to one or more access privileges 310 for a device ID 340 included in the credential 300. The NONCE 404 can be encrypted using the private key of the external device for verification based on the public key 352 included in the credential. The signature 405 can similarly be signed using a private key of the external device. The token 400 can be provided as a single token, as packets, or using any other packaging or transmission method. In some embodiments, the at least one credential 300 includes all credentials associated with the unique identifier or group identifier of the lock. In some embodiments a group identifier can be an identifier associated with a structure (e.g., an apartment building) containing multiple UUIDs.

In step 440 the lock performs a verification on the received token. In some embodiments, the verification can include evaluating one or more evaluation criteria. The evaluation criteria can include one or more of determining whether the signature(s) in the at least one credential(s) 300 was generated by a known authority, such as the could-based computing system 100; determining the validity of the security code 370; determining that the NONCE corresponds to the NONCE transmitted to the external device in step 420 (optionally by decrypting a public key 350 in the at least one credential 300), determining that the signature 405 is valid (e.g., properly generated using the private key associated with the public key 350); or determining that the lock's unique identifier or group identifier is contained in the device IDs 340. By determining whether an encrypted NONCE and/or signature 405 were generated with the proper public key 350 associated with the credential 300, the lock can determine that the external device that provided the credential is indeed authorized for the credential 300. In some embodiments the lock (or another device, such as a cloud-based computing system 100) can determine if the credential has been suspended, for example by comparing to a local black-list or sending a query to the cloud-based computing node to determine if the credential was backlisted.

In step 450 the lock verifies that the requested command is permitted. For example, the lock can verify that one of the at least one credential 300 is authorized for the command 402 and argument 403 by confirming they correspond to the listed access privileges 310 for the lock's device ID 340, and further that the command is submitted in accordance with the restrictions 330. If the credential 300 was shared, the lock can determine if it was shared in accordance with sharing rights 320.

Figure 5:
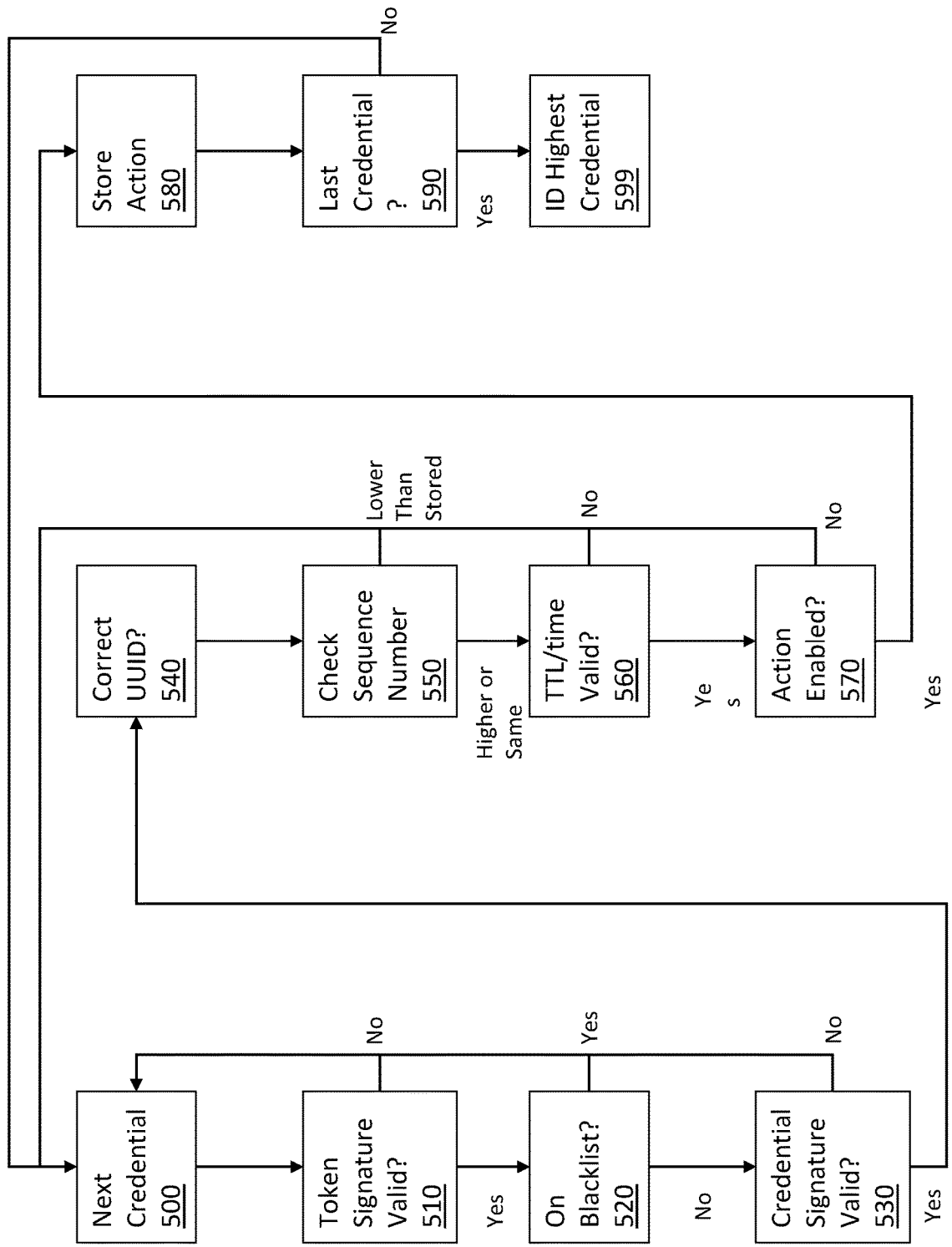
FIG. 5 is a flow diagram showing a verification process for a plurality of credentials, according to some embodiments.

In embodiments where multiple credentials are transmitted, the lock can apply the one or more verification criteria in step 440 and the verification in step 450 discussed above to each credential. Such a process is shown in FIG. 5. The lock can disregard each credential that does not meet one of the verification criteria. If no credentials pass the verification criteria, the lock can abort the transaction with an authorization failed status. In some embodiments, the lock can log or transmit information about a failed verification check. For example, the lock can transmit a message to a specified user or to a building manager with information associated with the failed verification such as information received in the step 430 and/or any information recorded by the lock or an associated monitoring device in association with the failed verification check.

In the step 460, the lock causes the requested command to be performed. For example, the lock can instruct a smart hub or a device with which the lock is in communication to perform the requested command. The lock can optionally send the valid credential associated with the requested command so that a smart hub or device can confirm permission for the requested command.

In some embodiments, the lock can maintain a list of each permitted device and action from the at least one credential 300. In some embodiments, the list is maintained with an order such that only the highest superset is applied. For example, where one credential requires that a photo be taken or logged when granting access, whereas another "higher" credential does not (e.g., it has fewer restrictions), the lock may apply a policy in accordance with the highest credential policy. In some embodiments, where the credentials are readable by the external device, the external device can send the credential with the highest policy.

In some embodiments, when a device, such as an access control device, receives a credential, it can log information about the credential. For example, the access control device can log information about the time of receipt, the source of the credential, and whether the credential is determined to be valid. If an activity is rejected due to an invalid credential, the credential payload (or a portion thereof) can be included within the activity log. If an activity is accepted, activity log can be created that captures relevant information pertaining to the actions the device took after this request. For example, in the case of an unlock, the log can include information on motor states before and after, as well as photo/video/audio data taken from a nearby or integrated monitoring device. Activity commands can also contain information about received commands, data transmitted during performance of an activity, and an identification of the device performing the logging. Activity logs can be transmitted to another device for storage and/or review, such as to manager access device 284, e.g., manager gateway, a user mobile device, or the cloud-based computing system 100.

FIG. 3B shows an example set of credentials 301A, 301B, 301C, and 301D for when a resident logs into an application on a user mobile device, according to some embodiments.

The credential 301A can be used to allow a user to access a lock at the user's residence, such as the smart access reader 212. As shown in FIG. 3B, the fields of the credential 301A include access privileges 311A to unlock, update, and FW upgrade, sharing rights 321A that allow for unrestricted sharing, TTL & schedule restrictions 331A which indicate an expiration of 1 week and no scheduling restrictions, device ID 341A of the of the user's smart access reader 212, the user's public key 351, delivery modality restrictions 361A which are null, and security code 371A.

The credential 301B can be used to allow a user to access a common area, such as a gym 207. As shown in FIG. 3B, the fields of the credential 301B include access privileges 311B to unlock, sharing rights 321B that allow for unrestricted sharing, TTL & schedule restrictions 331B which indicate an expiration of 1 week and usage only during 9 am to 9 pm Monday through Saturday, device ID 341B of the access control device 217 and smart device (smart exercise equipment) 297, the user's public key 351, delivery modality restrictions 361B which are null, and security code 371B.

The credential 301C can be used to allow a user to access common areas, such as access control device 211 and elevator 208. As shown in FIG. 3B, the fields of the credential 301C include access privileges 311C to unlock and floors 1 and 2, sharing rights 321C to unrestricted, TTL & schedule restrictions 331C which are set to 1 week, device ID 341C of the access control devices 208 and 211, the user's public key 351, delivery modality restrictions 361C which are null, and security code 371C. In some embodiment, security code 371C can include a Wiegand code to be provided to an elevator control panel 228 upon successful authentication of a credential by the access control device 218.

The credential 301D can be used to allow a user to control their smart home devices, such as hub and access control device 212, internal monitoring device 252B and the connected smart plug or outlet 292. As shown in FIG. 3B, the fields of the credential 301D include access privileges 311D to control smart home, sharing rights 321D set to unrestricted, TTL & schedule restrictions 331D which are set to one week, device ID 341D of the smart access reader 212, the user's public key 351, delivery modality restrictions 361D which are null, and security code 371D. Because smart devices are connected to the smart access reader 212, the UUIDs of each smart device can be but need not be provided in the credential 301D.

In an example use case for the credentials 301A, 301B, 301C, and 301D, when the user attempts to authenticate against the access control device 211 at the access point 201, e.g., front door, main entry way, main entrance, etc., credential 301C is sent, in conjunction with a signed NONCE and "unlock door" command, in response to the access control device's NONCE request.

In another example use case, when the user attempts to go to the gym 207, the credential 301B is provided to the access control device 217 in conjunction with a signed NONCE and "unlock door" command, in response to the access control device's NONCE request. Timing restrictions in the credential can be enforced by the access control device 217.

In another example use case, when the user attempts to authenticate against the access control device 212 at their unit entry door, credential 301A is sent, in conjunction with a signed NONCE and "unlock door" command, in response to the lock's NONCE request.

In another example use case, when the user wants to turn on their room lights using smart outlet 292, an HTTPS request is sent to the smart hub's control endpoint (e.g., in the cloud-based computing system 100 or directly from a mobile device), with credential 301D as a header entry in the request.

In some embodiments, the body of the request contains JavaScript Object Notation (JSON) describing the request (e.g., the action required by the credential), encrypted or signed by the private key of the credential bearer. In some embodiments, periodically (e.g., every two days), the application which handles credentials on the user's mobile device can request updated credentials to ensure the credentials stay up to date. In another example use case, when the resident's tenancy/access is scheduled to end, the cloud-based computing system 100 plans TTLs accordingly to ensure the user doesn't receive a credential that extends past the tenancy.

FIG. 3C shows an example set of credentials 302A and 302B for when a guest is provided temporary access, for example in a hotel, according to some embodiments.

The credential 302A can be used to allow a user to access a common area, such as the smart access reader 211 at the access point 201 and the access control device 218 on the elevator 208. As shown in FIG. 3C, the fields of the credential 302A include access privileges 312A to unlock, sharing rights 322A that are null, TTL & schedule restrictions 332A which indicate an expiration of 3 days and no scheduling restrictions, device ID of the access control device elevator 208, e.g., an access control device located in a elevator, access point 201, the user's public key 352, delivery modality restrictions 362A which are null, and security code 372A.

The credential 302B can be used to allow a user to access their room, such as room 203. As shown in FIG. 3C, the fields of the credential 302B include access privileges 312B to unlock, sharing rights 322B that are null, TTL & schedule restrictions 332B which indicate an expiration of 3 days and usage only from check-in time to check-out time, device ID 342B of the access control device 213, the user's public key 352, delivery modality restrictions 362B which are null, and security code 372B.

A credential similar to that of 301D can be used to allow the guest access to smart devices 290, 293A, 293B in accordance with the timing restrictions of the guest's stay. Usage of the credentials 302A, 302B can proceed similarly to those described with reference to FIG. 3A.

In some embodiments, if the guest cancels their stay, a blacklist entry is scheduled for the common area and the suite UUID doors. In some embodiments, a blacklist can be a list of devices that, even when presenting a valid credential, are nonetheless not given access to perform an operation. The blacklist can be provided to an access controller, for example from the cloud-based computing system 100 via the internet. For example, if a guest is issued a valid credential to access a hotel room but later cancels their reservation, information about the guest's device or credential can be added to the blacklist and provided to the access controller associated with the hotel room.

Guests that reserve the same room for the same days can be given credentials with greater sequences as added protection. A sequence ID can be, for example, a specified ID that provides an additional way to determine that a credential is invalidated. If a lock is presented a credential with a higher sequence ID than it has encountered before, the sequence ID can be retained and all credentials with a lower sequence ID can be considered to be invalidated. In this way, the cloud-based computing system 100 can invalidate prior credentials by simply providing an individual with a credential having a higher sequence ID.

FIG. 3D shows an example set of credentials 303A and 303B for when a service provider is provided temporary access to an apartment, according to some embodiments.

Credentials 303A and 303B are similar to and operate similarly to credentials 301A and 301C, respectively, but differ in that they include the public key of the service provider 353 and are valid only for 1 day and during the service window (e.g., 12 pm to 2 pm).

In some embodiments the credential provided from a user device to another device such as a smart access control device or a smart device can include a field for commands. A command can be used, for example, to instruct a device to perform a settings or firmware update, to instruct a device to turn on or off, instruct a device to pair with another device, or any other function. In some embodiments, the command further comprises a firmware update.

Figure 6:
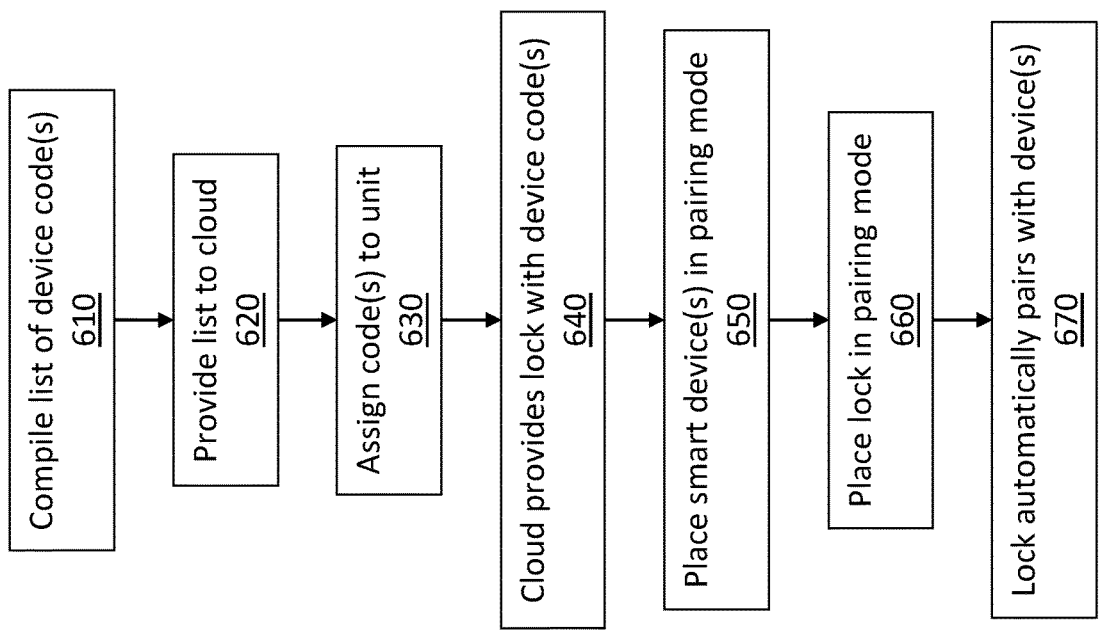
FIG. 6 is a flow diagram showing a process for pairing one or more smart devices with a hub, according to some embodiments.

As discussed above, in some embodiments an access control device or a smart hub can be linked to various smart devices in a location such that the cloud-based computing system 100 can be used for credentialing across access systems and for smart home devices. FIG. 6 is a flow diagram showing a process for pairing one or more smart devices with a hub in the system, such as a smart access controller or a smart hub, according to some embodiments. In step 610, an installer can compile a list of all smart device codes associated with smart home devices to be paired with a hub, which can be, for example, a smart lock. In some embodiments the installer scans a barcode on the smart device which links or translates to a code associated with each device. In some embodiments the installer can compile a file, such as a .csv file with the codes read from each device.

After compiling the list of device codes, in step 620 the installer can provide the device codes to the cloud-based computing system 100, for example by sending a list or .csv file. In step 630 the codes can be assigned to a building or a unit, for example a particular apartment. The assignment can be included in the information provided with the device codes or can be selected via an interface, such as a mobile application or a web interface. The cloud-based computing system 100 can store the list of devices to be paired in association with the assigned location.

In step 640 the cloud (or a device of the installer) can provide the device codes to the lock. The installer can then place the smart devices and the smart lock in paring mode in steps 650 and 660. In step 660 the placing of the smart lock in pairing mode can be automatically triggered by the cloud-based computing system 100 receiving the list of device codes. In pairing mode, the smart devices advertise the device codes already stored on the smart lock. Once all devices to be paired are in pairing mode, the lock can automatically pair with devices based on the list of device codes, for example by scanning over Zigbee for devices advertising the device codes in the list. In some embodiments, in this way, when pairing a large number of smart devices with a single smart lock (or other hub), the installer does not need to individually pair each smart device with the lock. This can reduce errors in pairing where a large number of devices are to be paired at once, for example in an apartment building when multiple new smart devices are being installed in many different apartments to different smart locks. In some embodiments, an installer can compile a single list for all units, devices, and locks, and transmit to the cloud-based computing node in one simple step.

By storing associations of smart device hubs with smart devices in the cloud-based computing system 100, devices can more easily be transferred from one tenant to another, or from one hub to another, or replaced. For example, when a smart device is to be replaced, an installer can simply update the device code in the cloud-based computing system 100, and begin at step 640 in FIG. 6. In some embodiments, an installer need only place the new smart device into a pairing mode, which can cause it to search for a network to join. The smart device hub can detect the device in pairing mode, and provide the smart device with a network key to add the device to the network. The cloud-based computing node can then store the install code read by the smart hub in such a way that indicates that the smart hub and device are paired.

In some embodiments, pairing via the cloud-based computing system 100 enables simple testing of pairings. In some embodiments, an installer or other manager can transmit a request to the cloud-based computing system 100 to confirm successful pairing. The cloud-based computing system 100 can send a test command to the smart lock, which can in turn relay a command to the smart device. The smart lock can then confirm that the smart device has successfully responded to the command.

In some embodiments, WiFi can be more easily swapped or altered. For example, a user can transfer WiFi credentials stored on their mobile device to the smart home hub, e.g., directly or via the cloud-based computing system 100 using an application or web interface. Furthermore, the hub can the transfer these credentials to each smart home device to permit WiFi access.

In some embodiments, storing pairings of devices in cloud-based computing system 100 as part of an access system can simplify user and manager experiences. For example, by pairing smart devices to a hub (e.g., a smart lock), a user of the smart device (e.g., a tenant) can use the same application or web interface to control access devices as well as smart home devices. The same credentialing system described throughout the present disclosure can be used both to unlock a dual lock/smart hub and to instruct, via cloud-based computing system 100, the lock to send commands to paired smart home devices. In another example, a manager can easily transfer control of smart home devices by changing the user associated with the unit having an association with smart home devices, vastly simplifying tenant changes when a unit includes smart home devices such as a smart thermostat or smart lights. In another example, managers can give maintenance workers temporary administrative permissions on smart devices that are having problems, allowing maintenance workers to fix the issue without exposing the resident to a larger security risk. In another example, a manager can control smart devices, such as a smart thermostat, in vacant units to maintain energy efficiency without having to manually adjust each unit. In another example, both managers and tenants can receive notifications of problems, such as leaks detected by smart leak detectors. By linking smart access devices and smart sensors such as leak sensors in the same cloud-based computing system 100, managers can easily understand which apartments are experiencing issues without having to maintain a separate list that matches apartments to smart devices. In another example, a manager can more easily manage permissions for particular smart devices in common areas without having to make changes on smart devices or smart hubs. In such an example, a user may receive an updated credential which is valid at a smart device hub, which then provides access to sending commands to associated smart devices.

Figure 7:
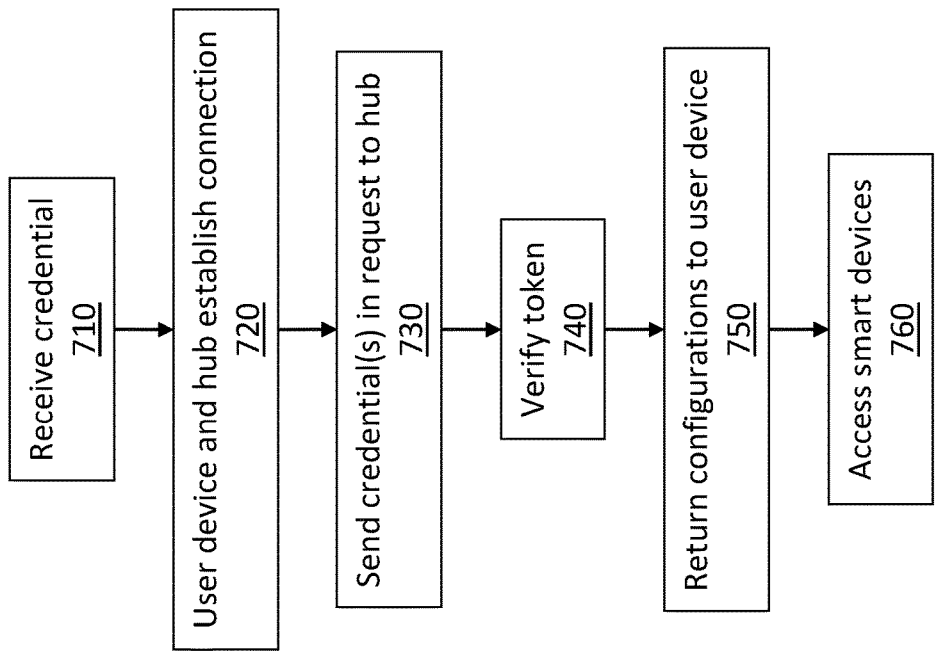
FIG. 7 is a flow diagram showing a move in process for a building, according to some embodiments.

FIG. 7 is a flow diagram showing a move in process for an apartment building equipped with both smart access readers and smart home devices, according to some embodiments. As shown in FIG. 7, in step 710 a user may first receive at least one credential associated with a "move in" action, for example from the cloud-based computing system 100 or from a property manager, at their mobile device. The credential can include a plurality of credentials, each associated with various smart devices in the unit (e.g., smart lights, thermostats, etc. managed by the hub). In step 720, the user's mobile device can establish a connection with a smart hub, such as a smart access reader, for example via a web interface or a mobile application. In step 730, the user's mobile device can send a "move in" request token including the credential(s) to the smart hub. In step 740 the hub can perform a verification, such as that described with reference to FIG. 6A, of the credential(s) and commands in the token. The smart hub can cache or otherwise store information about each authorized credential in accordance with any restrictions, such as TTL restrictions.

In step 750, for all devices that are permitted by the requested credential(s), the smart hub can return a configuration for each permitted smart device to the user's mobile device, along with endpoints on the hub for how to control them. These endpoints can be pre-configured with, for example, a URI encoded form of the session token stored thereon, to prevent having to credential each time. A user can change a configuration on the smart device to stop storing the URI-encoded form of the session token when the user wants to switch to having to present a credential again. In step 760, the user can then control the configurations and other features of the smart devices using their user device. Using this process, multiple users can occupy a single unit with a single hub, but only have access to particular smart home devices. For example, if several people are sharing an apartment (i.e. dorm rooms), then all users may be given access to all the common area lights, but only their own bedroom. In some embodiments, a manager can "lock" or "unlock" features in an apartment simply by changing credentials on the cloud-based computing system 100. In this way, a manager can include premium smart home devices in each unit, but only enable them for particular units who pay for the credential.

In some embodiments, the cloud-based computing system 100 can configure credentials in a way that facilitates the features described throughout the present disclosure while maintaining an efficient storage, processing, transmission, and authorization process. For example, the cloud-based computing system 100 can implement a set of heuristics that balances the transmission size for all applicable resulting credentials for the user, the authentication time and security of the credential, the mode of transmission (NFC, BLE, etc.), and permissions contained within the credential.

In some embodiments, if there are two units or sets of devices/access points for a single user with identical privileges, both can be combined into one entry on the cloud-based computing system 100. Upon each credential request, the cloud-based computing system 100 can return all credentials. In some embodiments if the user has access to dozens of devices, the entries can be split up individually by unit/set of devices/access points to ensure that the least data is sent on each event. How the cloud-based computing system 100 groups credentials can be user-configurable, manager-configurable, and/or automated by the cloud-based computing system 100.

In some embodiments, restrictions are dependent on various aspects of a credential. For example, a credential's TTL could be dynamic, with the time based on the modality of delivery. NFC based ones could be configured to be longer-lived, while BLE could be shorter. Such configurations could balance the risk of issuance of longer credentials with the inconvenience of having to keep generating and receiving new ones.

In some embodiments a credential holder can cryptographically attenuate a credential stored on their device. In such an embodiment, the user can modify a credential that was issued by the cloud-based computing system 100, and restrict it further temporarily on their local device for transmission externally. For example, a user can modify a credential that allows access to a lock between a certain set of times by attenuating it to be only applicable for a narrow window to share with cleaning staff. A cryptographic chain of trust can be used to verify that the holder was the one that attenuated it, and the original credential was legitimate. In some embodiments, a user can attenuate a credential before it is sent at the point of transmission, to further reduce a security attack.

In some embodiments, third parties authorized for an access point or device (e.g., a service provider) can attenuate a general access credential to a narrower window before issuing it to a specific employee tasked with carrying out a service. If the resident has issued a credential that allows 3-5 pm access on M-F, the service could internally attenuate to a 1 h window on the day of service.

In some embodiments, a user can share access to any smart home devices without having to go through the cloud-based computing system 100. Instead, the user can simply share an attenuated credential with another user. In some embodiments, attenuation is instead carried out by the cloud-based computing system 100, which would either provide an attenuated credential to the requesting user for transmission to the other user, or directly to the other user.

In some embodiments, once access to an area, such as an apartment, is transferred to a user, such as a tenant, the cloud-based computing system 100 can change or remove access thereto by any other entity, such as building management, in the database and blacklist any outstanding credentials. In this way, management will lose some or all access to devices now under the purview of a tenant, thereby ensuring privacy to the tenant. In some embodiments, when the tenant moves out of the apartment, the tenant can then transfer access privileges back to management. In some embodiments, when the apartment is first transferred to the tenant, management access is limited or removed for the period until the lease expires. The database can store this expiration date, and transfer control back to management upon expiration of the lease. In some embodiment, activity logs relating to a particular tenant are either transferred to the tenant or destroyed when the tenant moves out.

Figure 8:
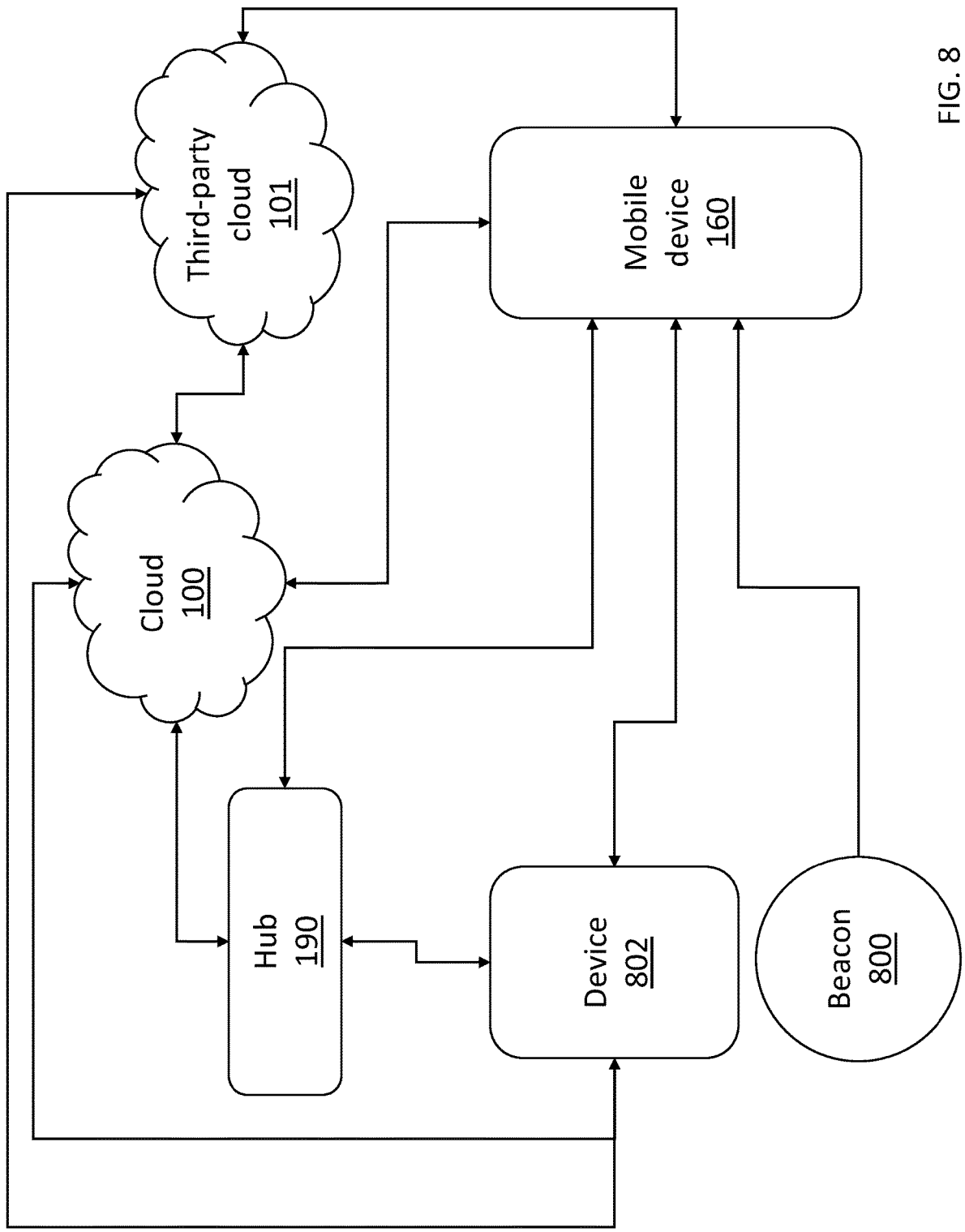
FIG. 8 is a block diagram showing a beacon-based access system, according to some embodiments.

FIG. 8 is a block diagram representing a system architecture for a beacon-based access system, according to some embodiments. As shown in FIG. 8, the system architecture can include a cloud-based computing system 100, a third-party cloud-based computing system 101, a mobile device 160, a hub 190, a device 802 (which can be a smart device), and a beacon 800. In some embodiments, the smart device 802 can be a smart home device, such as the smart outlets 293A, 293B, smart thermostat 293B, smart exercise equipment 297, or any other type of smart home device. In some embodiments, the smart device 802 can be an access control device, such as a smart lock, or an elevator.

As shown in FIG. 8, various components in the beacon-based access system can be connected using various types of communication technology, depending on particular implementations. For example, the mobile device 160 can communicate with the cloud-based computing system 100 via a WiFi internet connection, a cellular network, and/or any other communication technology. The mobile device 160 can communicate with a third-party cloud-based computing system or device 101 using a WiFi connection, a cellular network, and/or any other communication technology. The mobile device 160 can also read information stored or imprinted on the beacon 800 using an NFC reader, a camera (e.g., for capturing pictures of a QR or barcode), and/or any other sensor or an active beacon, such as an active NFC beacon, a BLE beacon, an audio beacon (e.g., ultrasonic encoding), or a display that changes an image such as a QR code. User mobile device 160 can also communicate with the hub 190 and smart device 802 via Bluetooth, WiFi, NFC, and/or any other connection technology. The hub 190 can communicate with the smart device 802 via Bluetooth, Zigbee, Z-wave, Wifi, a wired serial bus, and/or any other type of communications technology and/or protocol, and can further communicate with the cloud-based computing system 100 and/or third-party cloud-based computing system 101 via a ethernet, WiFi, and/or cellular network connection. The cloud-based computing system 100 and third-party cloud-based computing system 101 can communicated via, for example, an IP connection.

Figure 9A:
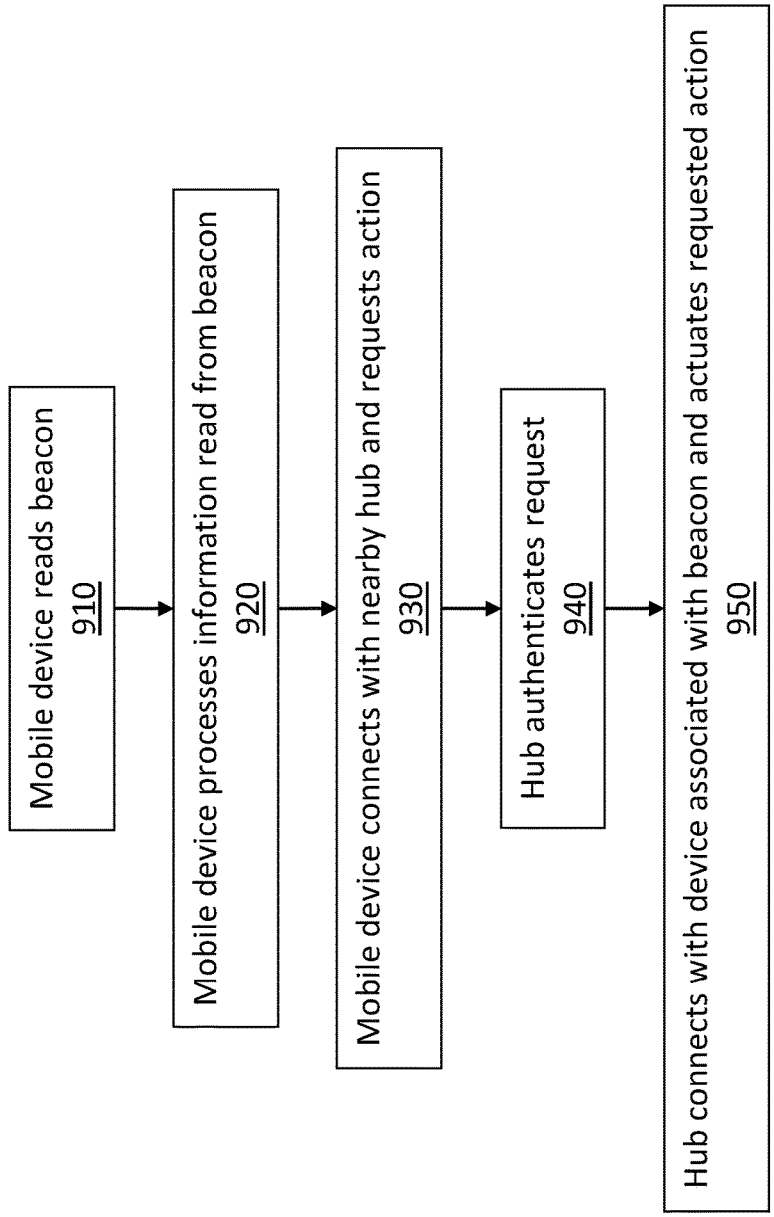

FIGS. 9A-9D are flow diagrams showing example operation of beacon-based access systems, according to some embodiments. For example, FIG. 9A is a flow diagram showing a beacon-based access system operating via hub control of requests. As shown in FIG. 9A, operation begins in step 910, where the mobile device 160 reads the beacon 800. For example, where the beacon 800 is a passive, unpowered NFC tag containing an NFC Data Exchange Format (NDEF) record, the user's mobile device 160 can scan the NFC tag beacon 800 when in proximity thereto and read the NDEF record. In some embodiments, the beacon 800 can include information about an action to be taken with the associated device 802. The action can include, for example, a request to unlock a smart lock or a request to change the on/off status of a smart plug. In some embodiments, the beacon 800 can include a beacon ID to identify the beacon from which the information was read. In some embodiments, the information read from the beacon 800 can include an indication or route to an associated mobile application, an indication or information for accessing the device 802 associated with the beacon 800. In some embodiments, the information read from the beacon 800 can include a public key or a device key, such as an associated device 802 or a nearby smart hub associated with the device 802. This public key can be used as part of a security process by the user's mobile device 160 with the device 802 or the smart hub, for example as described throughout the present disclosure. For example, the public key can be used alone, or using an Elliptic-curve Diffie-Hellman (ECDH) technique (e.g., either with a key associated with the user's mobile device 160 (or the user) as the other portion of the curve or with a session key as the second portion). When using an ECDH protocol with a session key, the user's mobile device 160 can compute a session key pair, and ECDHs the private portion with the public key read from the beacon. The resultant ECDH is used by the user's mobile device 160 for communication with the device 802 and/or a nearby hub. In a non-session key example, the beacon 800's public key can be used to encrypt or sign information without use of a session key.

In some embodiments, the information contained in the beacon 800 can be read as a universal resource identifier (URI) such as a universal resource locator (URL), where each portion of the URL indicates a different information type (e.g., with portions being separated by backslashes or dashes, or designated by a particular length). For example, a URI "https://dev-api.latch.com/unlock/A5BCD8A0-295B-4CB1-AA45-0274A73594C6?requestTagID=1234" could be broken down as follows:

A domain to route requests to a mobile application: "https://dev-api.latch.com/"

An action to be conducted: "/unlock"

Information to address the device 802 associated with the beacon 800 (e.g., a unique arbitrary code): "A5BCD8A0-295B-4CB1-AA45-0274A73594C6"

Information to capture any additional data that needs to be sent to perform the action, encoded as URI parameters, such as a beacon ID: "?requestTagID=1234"

A person of skill in the art would understand from the present disclosure that information on the beacon 800 can be read using a variety of different formats, such as various other forms of strings, organized data with particular fields, etc. In some embodiments, where more than one action is/can be conducted, a particular format can be used to indicate or separate different actions within the information read from the beacon 800. In some embodiments a URI scheme can designate particular fields or classes, such as "secKey= . . . " and "defaultAction= . . . " in "http://dev-api.latch.com/actionTag?supportedActions= . . . &requestTagID= . . . &secKey= . . . &defaultAction= . . . &supportedActions= . . . " where actionTag is a list of key value pairs, secKey indicates a security key, defaultAction is a default action from a list of supported actions in supportedActions, etc. A user can be prompted to select an action where multiple actions are supported. The information described above is non-limiting, and other fields or types of information are contemplated. In some embodiments, if the information is URI encoded on the beacon 800 and delivered with a standard format for transmission of such encoded content, such as QR codes or NFC, the OS of the user's mobile device 160 ensure that the user is routed to the appropriate application or web interface. In some embodiments, such as BLE beacons, instructions to reach the appropriate application or web interface can be wrapped in a field in, for example, an Eddystone (e.g., the "Eddystone-URL" field) or iBeacon format, at which point the OS of the user's mobile device 160 can route the information to the desired application or web interface. In some embodiments, where the OS is not capable of appropriately routing to an application or web interface, the user can initiate the appropriate application or web interface, which can read the beacon 800.

At step 920, the user's mobile device 160 can process the information read from the beacon. In some embodiments, processing can include recognizing and launching a mobile application associated with the information read from the beacon 800 in step 910. For example, where the information read from the beacon 800 is in the form of the URI discussed above, the user's mobile device 160 can recognize a mobile application associated with the domain "https://dev-api.latch.com/" and launch that mobile application. In some embodiments, the mobile device 160 then provides the additional information read from the beacon 800 to the mobile application, such as the action to be conducted, the information to address the device 802, and any other additional information such as a beacon ID. In some embodiments, where the information read from the beacon 800 does not include information to address the associated device 802 and/or determine which actions can be requested, the mobile device 160 can communicate with a hub 190 or the cloud-based computing system 100 to obtain such information. In some embodiments the mobile device 160 processes the information without using the internet.

During processing, the mobile application can determine whether the user has valid access to the device 802 associated with the beacon 800 based at least in part on the information read from the beacon 800 (or received from a hub 190 or cloud-based computing system 100). For example, the mobile application can search a set of credentials stored locally on the mobile device 160 to determine if there is a valid credential, subject to any access restrictions, for the device 802 based on the information to address the device 802 and/or the beacon ID of the beacon 800 (e.g., without using the internet). In some embodiments, the mobile application can communicate with the cloud-based computing system 100 or the third-party cloud-based computing system 101 to validate a credential or otherwise determine that the user has valid access to the device 802. In some embodiments, the user of the mobile device 160 may be prompted to input additional information, such as a username and/or password, to assist with determining whether the user has valid access to the device 802. In some embodiments, other forms of authentication are used, such as biometric authentication. In some embodiments, where a virtual intercom is launched on the mobile device 160 or a call is initiated with a virtual doorman, the user can be asked to provide additional input or provide a selection of what action to take. Once launched, the virtual intercom or virtual doorman can interact with and/or receive input from the user using voice, text search, link selection, etc. in order to determine which action should be taken. In some embodiments, if the appropriate application is not downloaded on the user mobile device 160, a prompt can be triggered to download the appropriate application.

In step 930 of the hub-based operation, the mobile device 160 connects with nearby hub 190 and requests an action for the device 802. For example, in some embodiments, the mobile device 160 can search for a hub 190 in proximity to the beacon 800, for example based on the strength of signal of a WiFi or Bluetooth-based hub. In some embodiments, the mobile device 160 is already registered with the hub 190, and simply sends a communication to the hub 190 in association with the requested action. The request for an action can include, but is not limited to, an indication of the action to be taken (e.g., the action read from the beacon 800), information about the device 802 (e.g., the information to address the device 802 read from the beacon 800), information about the mobile device 160 or a user/account associated therewith, and/or the user's credential or another token to authenticate the request. In some embodiments, communication between the mobile device 160 and the hub 190 is performed without connecting to the internet.

In step 940 the hub 190 authenticates the request, for example using any of the techniques described throughout the present disclosure. In some embodiments, the hub 190 authenticates the request without using to the internet based on information stored on the hub 190. In step 950, the hub 190 connects with device associated with beacon (e.g., via a BLE, Zigbee, or Z-wave connection) and performs a requested action (e.g., causes the device 802 to unlock or change an on/off status), for example as described in more detail throughout the present disclosure. In some embodiments, the hub 190 connects with the device without using to the internet.

In some embodiments, the device 802 can be operated or otherwise connected to a third party service for controlling access (e.g., integrated with a third-party cloud-based computing system 101) and not otherwise be integrated with or support the functionality associated with the cloud-based computing system 100, such as access logs, varied permissions among users, multiple user support, etc. In such embodiments, the hub 190 can act as an abstraction layer to make the device agnostic to these functions, while still providing such functionality on behalf of the device. For example, if the device 802 is a basic smart lock that does not support more than one user (e.g. there is only one valid credential, such as one provisioned during device manufacturing) and/or has no support for time-restricted access, access logs, remote access, etc., the hub 190 can provide such functionality. For example, the hub 190 can pair with the smart lock as the only "user," and can perform the authentication of permissions, time-restricted access enforcement, logging, etc. in place of the lock, and send the command to "unlock" as the device's only user when necessary. Rather than presenting the credential to the device 802, a user can use the beacon-based operation described with reference to FIG. 9A or 9B to gain access to the device 802. Accordingly, third-party devices that are not configured to be integrated with the smart home or building system of FIG. 1A can nonetheless be integrated into such a system with full or partial functionality facilitated by the hub 190 and/or beacon 800.

As discussed above, the device 802 can be one of a number of different types of devices, such as, but not limited to a lock, elevator, smart home device, turnstile, or other type of device capable of interfacing with a smart building system. As described in more detail throughout the present disclosure, the credentials used during the operation of a beacon-based access system can provide access to a number of different features, such as locking or unlocking a door, accessing a particular floor of a building, accessing control of a smart thermostat/light/leak sensor/switch/button/exercise equipment/air quality monitor/etc., powering a device/circuit through a smart switch or connected panel, actuating a window blind, turning on a fan, turning on an appliance, turning on a TV, purchasing an item, renewing a subscription purchase, etc. Accordingly, the same credentialing system can be used across the entire smart building system, even with third-party devices that are not otherwise configured to interface with the smart building system.

Figure 9B:
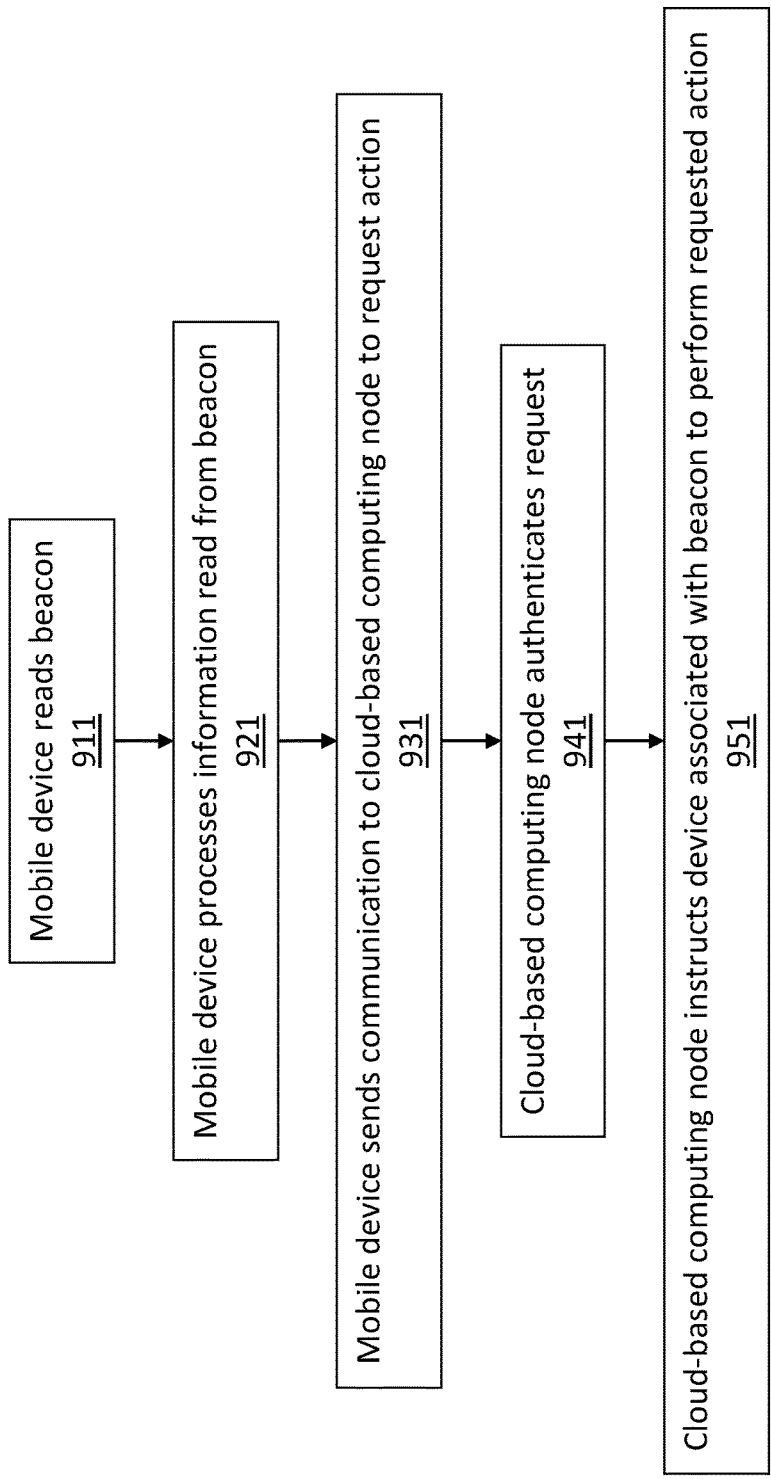

FIG. 9B is a flow diagram showing a beacon-based access system operating via internet/cloud control of requests, according to some embodiments. The operation initially proceeds similarly to the operation described with reference to FIG. 9A. For example, in step 911 the mobile device 160 reads the beacon 800 and then processes the read information in step 921.

In step 931, rather than connecting with a hub 190, the mobile device 160 instead sends a communication to a cloud-based computing node to request an action. The communication can be to cloud-based computing system 100 and/or third-party cloud-based computing system 101. The decision to communicate with a cloud-based computing node (FIG. 9B) rather than hub 190 (FIG. 9A) can be contained, for example, in the information read from the beacon 800 (e.g., via the format or a field of the information to address the device 802) or hard coded into the mobile application. In some embodiments, communication with a cloud-based computing node can be responsive to a changed or unreachable endpoint or an incorrect action by the mobile application. Like the request to the hub 190 in the step 930, the request to the cloud-based computing node can include, for example, an indication of the action to be taken (e.g., the action read from the beacon 800), information about the device 802 (e.g., the information to address the device 802 read from the beacon 800), information about the mobile device 160 or a user/account associated therewith, and/or the user's credential or another token to authenticate the request.

In step 941, the cloud-based computing node can authenticate the request from the mobile device 160, for example using the techniques described in more detail throughout the present disclosure. In the step 951, the cloud-based computing node can cause the requested action to be performed on the device 802, for example, using the techniques described in more detail throughout the present disclosure. In some embodiments, the cloud-based computing system 100 can send a communication to a hub 190 including a credential and/or an indication of the requested action, which can authenticate the request and perform the action on the device 802. In some embodiments, the cloud-based computing system 100 can send a communication including a credential and/or an indication of the requested action directly to the smart device 802, for example using a WiFi or cellular network, to perform the action. In some embodiments, the cloud-based computing system 100 simply forwards the same request received from the mobile device 160 to the hub 190 or the device 802. In such embodiments, the cloud-based computing node can skip the authentication step 941 and instead pass authentication responsibilities to the device 802.

In some embodiments, where the device only supports remote access via a third-party cloud-based computing system 101, the cloud-based computing system 100 can send a communication to the third-party cloud-based computing system 101 requesting the desired action. The third-party cloud-based computing system 101 can then perform the action on device 802 using the third party's own remote actuation processes, which can but do not necessarily require use of a hub 190. Such operation is shown in FIG. 9C, with steps 912, 922, 932, and 942 corresponding to steps 911, 921, 931, and 941 in FIG. 9B. At step 952 the cloud-based computing system 100 can send a request to a third-party cloud-based computing system 101 to perform the requested action. In some embodiments, such a request involves reformatting some of the information contained in the request received in the step 932, for example, to match a third party's proprietary request format. In some embodiments, additional information stored on the cloud-based computing system 100 can be added to the request, such as a third-party or device-specific credential required for authentication with the third-party cloud-based computing system 101. The third-party cloud-based computing system 101 can then authenticate the request, and instruct the deice 302 to perform the requested action using the third party's remote actuation protocol. In this way, the same process can be used both for devices associated with the cloud-based computing system 100 as well as third-party devices, without having to use different beacons, permissions, and/or mobile applications. Furthermore, in the event that the device 802 and/or third-party cloud-based computing system 101 are not integrated with the smart building system's logging system, cloud-based computing system 100 and/or hub 190 can update applicable logs to include access and use information.

Figure 9D:
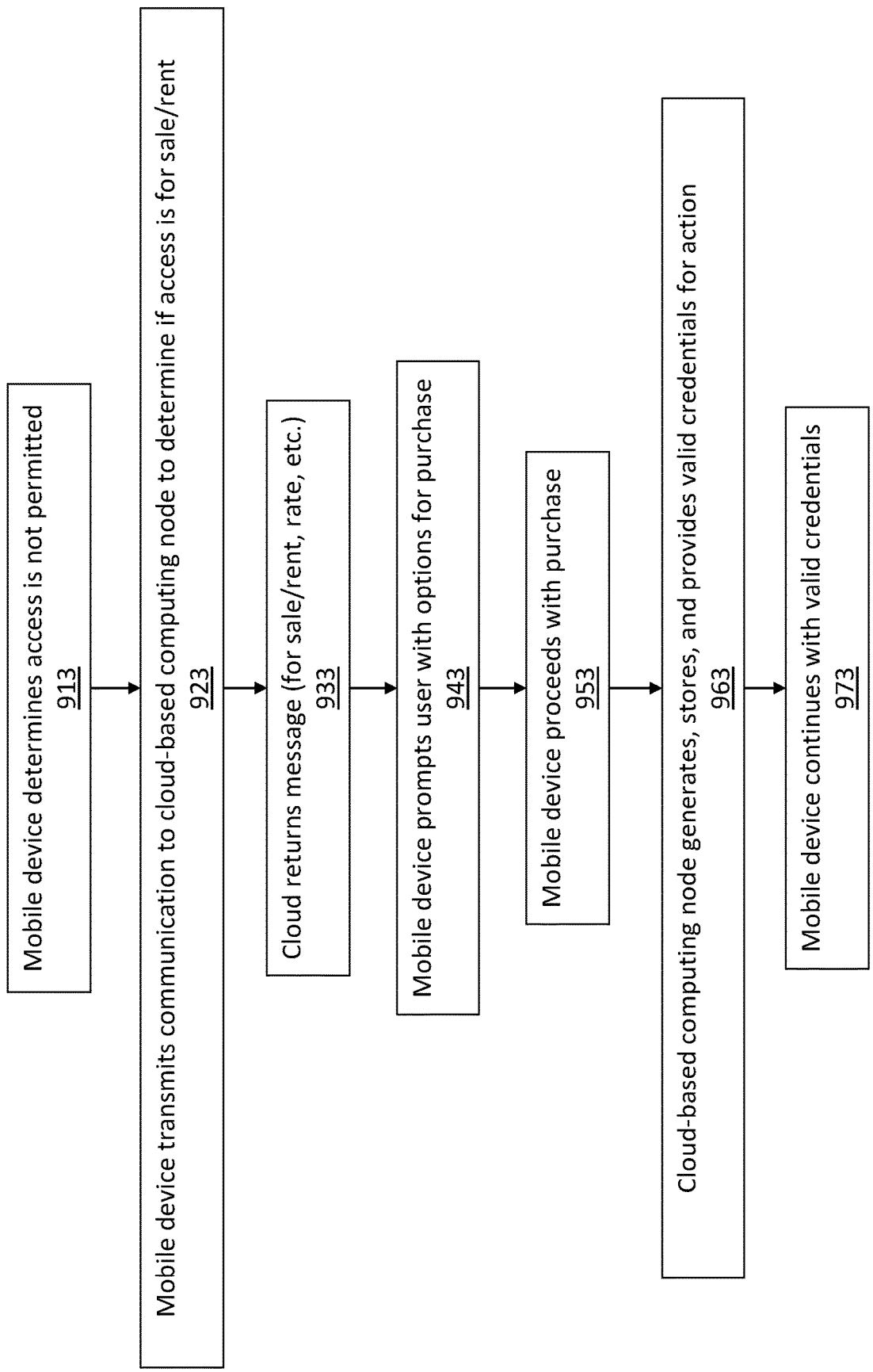

In some embodiments, it may be determined at one of steps 920, 921, or 922 or steps 940, 941, or 942 that access is not permitted to the device 802. For example, the user may be attempting to access a hotel room for which they do not have a valid credentials or at a time outside the time restrictions of a valid credential. FIG. 9D shows an example process for purchasing access. In a non-limiting example, the process in FIG. 9D can be used, for example, to purchase access to an access device (e.g., a smart lock) associated with a hotel room or other rentable resource such as shared office space, according to some embodiments. As shown in FIG. 9D, at step 913 the mobile device determines that access is not permitted to the device 802. In step 923, the mobile device 160 transmits a communication to cloud-based computing system 100 to determine if access is for sale or rent. Such a communication can include an indication of the device 802, for example from information read from beacon 800, and/or information about the requesting party, for example based on information about the user or the mobile device 160 stored on the mobile device 160. The cloud-based computing system 100 can then return a message in step 933 with information about whether access to the device 802 is for sale/rent, and, if so, the applicable rate or rates, terms, and/or other information related to the rentable resource. If access to the device is not currently available for sale/rent, the cloud-based computing system 100 can return a message indicating that the device is not available and can optionally include information about future availability or options to rent (e.g., a contact us link).

In step 943, if access is for sale or rent, the mobile device 160 can prompt the user with options for purchase, including displaying rates, terms, limitations, etc. received from the cloud-based computing system 100 in the step 033. In the step 953, the user can proceed with the purchase using the mobile device, for example by inputting credit card information or accepting a charge to an account associated with the user or mobile device 160. In step 963, the cloud-based computing system 100 can generate, store, and/or provide one or more valid credentials for the action with the device 802 to the mobile device 160 in accordance with any restrictions on access. In step 973, the mobile device 160 continues with valid credentials, for example at steps 930, 931, or 932 in FIGS. 9A, 9B, and 9C, respectively. In some embodiments, rather than performing a local authentication via the mobile device 160 after receiving the credential, the cloud-based computing node can initiate a remote performance of the desired action that has just been credentialed, rather than making the user perform a local request again. In this way, the desired action can be performed immediately upon grant of a valid credential, while in the future the mobile device 160 can perform local requests with the newly issued credential. In some embodiments, rather than proceeding with steps 923-953, the cloud-based computing node can instead confirm whether an account associated with the user's mobile device 160 should have access to the device 802. If the answer is yes, then the cloud-based computing node can send the appropriate credential, rather than requiring the user to purchase a credential.

A person of skill in the art would understand based on the present disclosure that purchasing access could occur at other points during the operations described in FIGS. 9A-9C. For example, if another element such as the third-party cloud-based computing system 101 determines that access is not permitted, a communication could be sent to the mobile device 160 to trigger the process of FIG. 9D. In addition, other credentialing processes could be provided that do not involve purchasing a valid credential. For example, in some embodiments, if a valid credential is not available, rather than proceeding with the process for providing access shown in FIG. 9D, the mobile device is redirected to a virtual intercom system. For example, the mobile device could be directed to a web-based or application-based interface. The interface can be configured to connect the user seeking access to the device 802 with someone who can permit access. For example, where the device 802 is a smart lock at an access point for a building, an audio or video connection can be established between the user's mobile device 160 and a mobile device of a resident of the building, for example using a cellular, VOIP, or other type of connection. If the resident wants to provide access to the user of the mobile device 160, they can be prompted to do so from their mobile device. In some embodiments, where multiple residents occupy a single building, such as in an apartment building, the user of the mobile device 160 can be prompted to input an apartment number or the name of a resident who they wish to contact. In some embodiments, the mobile device 160 can emulate an existing or virtual intercom on a web app, which can allow the user to follow the same process of selecting the unit and then the residents of that unit's selected identifiers. In some embodiments, the user mobile device can establish a connection with a manager of the building or with a security station associated with the access point for the building. The manager or an operator at the security station can then determine whether to grant access to the visitor. In some embodiments the web or application-based interface includes a virtual doorman with whom the visitor can interact and to whom the visitor can provide information in order to determine which resident to contact and/or whether to grant the individual access to the building.

In some embodiments, the link between a device 802 and a beacon 800 can be pre-provisioned during manufacturing of the beacon. For example, the beacon 800 can be provisioned during manufacturing with the URI described above. In some embodiments, at least some of the information included in the URI can be provided by a consumer about a particular device 802 that will be associated with the beacon 800. For example, a consumer may purchase a beacon 800 for use with a particular device 802, and the beacon 800 can be manufactured and provisioned with the appropriate information to link the beacon 800 and device so that no set-up is required. In some embodiments, at least some of the information included in the URI can be provided by a manufacturer of the device 802. For example, a manufacturer of the device 802 can provide information for accessing respective devices 802 and functionality associated with devices 802 (e.g., unlock, on/off, etc.). The devices 802 and associated beacons can then be sold in pairs. In some embodiments, at least some of the information included in the URI can be provided by the manufacturer of the beacon 800. For example, different beacons 800 can be sold for different types of devices (e.g., smart locks, smart outlets, etc.), and therefore can be provisioned with particular actuatable actions in the information stored in the beacons 800. Each different beacon 800 can be provisioned with a type of action associated with the type of device 802 (e.g., lock/unlock, on/off, etc.). Each beacon 800 can also be provisioned with at least one of a beacon ID or information to reach the device 802. The beacon ID can serve to identify the beacon 800, for example where more than one beacon is associated with a particular device 802. The information to reach the device 802 can be generic or arbitrary information during initial manufacturing such that no link between the information and the device 802 has yet been established. Such as link can be established after manufacturing as described below.

In some embodiments, a device 802 and beacon 800 can be registered during pairing with a hub 190. For example, a hub 190 or mobile device 160 can read the information to reach a device 802 from the beacon 800 during pairing, and can associate such information with the particular device 802 being paired. In some embodiments, the information to reach a device 802 can be provided visually on a package or other element sold with the device 802 such that a user can manually input the information to reach the device 802 such that the beacon 800 can be paired with a particular device 802. The information can then be provided to a mobile device 160 or other entry point into the smart building system to be associated with information to reach the particular device 802. Such information can be stored at the hub 190, the cloud-based computing system 100, or both, to establish a record of which device 802 is to be reached based on the provided information. Accordingly, when a mobile device 160 reads information on the beacon 800, it can contact one or more of the hub 190 or the cloud-based computing system 100 to obtain information identifying the associated device 802.

In some embodiments, information can be provided either to the hub 190, the cloud-based computing system 100, or both after pairing such that a link with a beacon is established after pairing. In some embodiments, if the device 802 knows the information stored on the beacon 800, the device can provide the hub 190 and/or the cloud-based computing system 100 with such information during or after pairing. In some embodiments, the hub 190 or cloud-based computing system 100 can inform the other of the link between the information on the beacon 800 and the device 802.

In some embodiments, the beacon 800 only stores a tag ID, such as a UUID containing a random/arbitrary identification number. The UUID can be sent to the cloud-based computing system 100 after manufacturing and a link to a particular device 802 can be established later, for example during or after pairing as described above. In some embodiments, each manufacturer of beacons 800 can include a prefix to the UUID such that there are no collisions between UUIDs manufactured by different companies. In some embodiments a manufacturer of the beacons 800 can request UUIDs for devices that it is manufacturing from the cloud-based computing system 100 and further provide the cloud-based computing system 100 with information the manufacturer wishes to be stored with the UUID on the cloud-based computing node (e.g., model numbers, etc.).

In some embodiments, the link between the beacon 800 and a device 802 can be established based on the UUID assigned by the cloud-based computing system 100 or the manufacturer of the beacon 800. Furthermore, in such embodiments, the processing steps 920, 921, and/or 922 described above can involve contacting, by the mobile device 160, the cloud-based computing system 100 and/or a hub 190 to determine which device 802 is associated with the beacon 800, what actions are associated with the device 802, and/or how to reach the device 802. In some alternative embodiments, the mobile device 160 does not need to learn information for contacting the device 802 associated with a beacon 800. In such embodiments, the mobile device 160 does not identify credentials for the device 802, and instead sends information to the cloud-based computing system 100 or hub 190 identifying the beacon 800 (e.g., the beacon ID) and the mobile device 160 (or a user thereof), and the cloud-based computing system 100 or hub 190 can identify the device 802 based on the beacon ID, and determine whether the user is authorized to perform the desired action the device 802.

Figure 10:
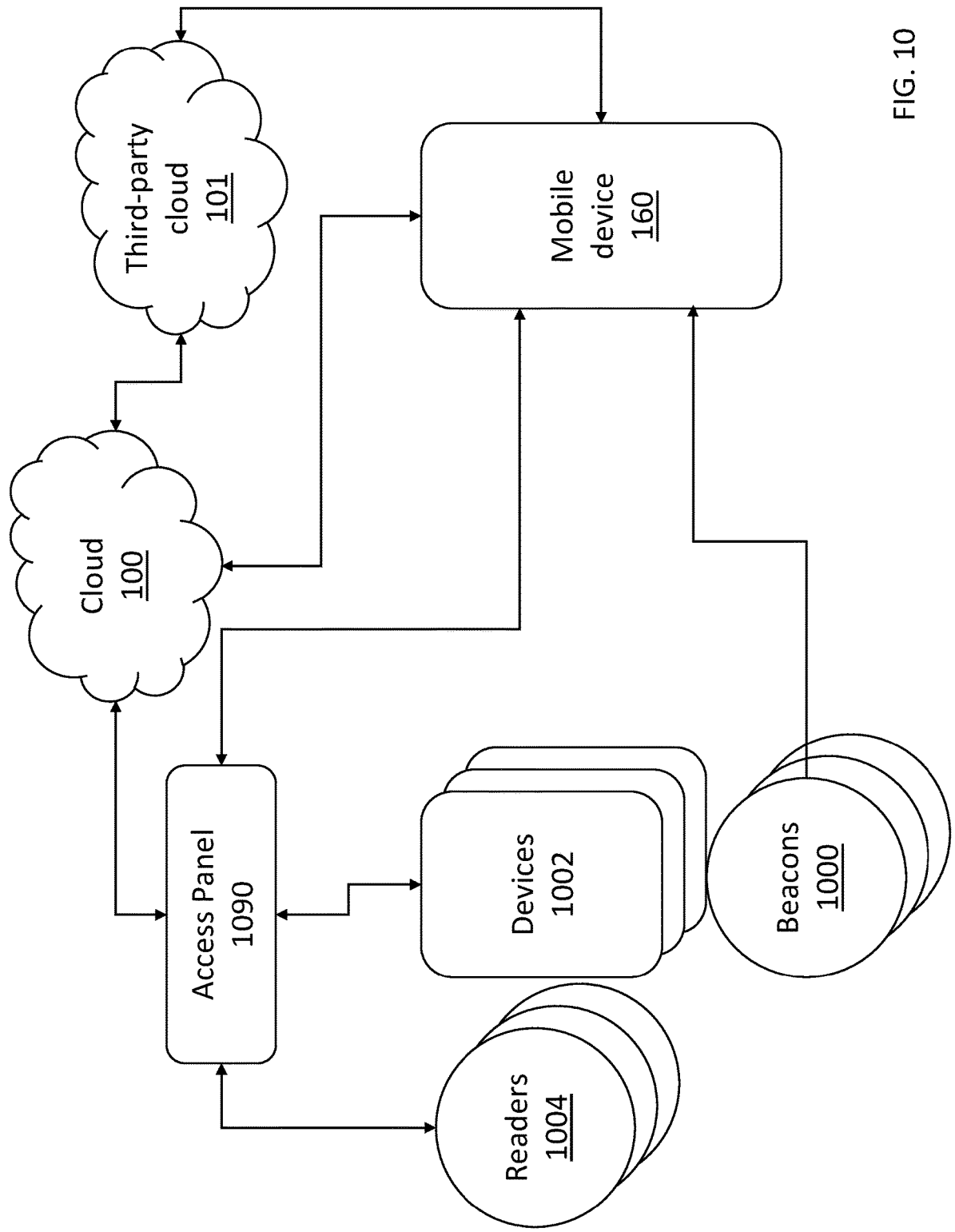
FIG. 10 is a block diagram showing a beacon-based access system, according to some embodiments.

FIG. 10 is a block diagram showing a system architecture for beacon-based access to devices. The system architecture in FIG. 10 is similar to that in FIG. 8, but differs in that the cloud-based computing node can communicate with an access panel (e.g., via a wired or wireless internet connection) to provide access to a device. Therefore, as shown in FIG. 10, a building may include a central access control panel 1090 capable of communicating with one or more of the cloud-based computing system 100 and mobile device 160. Control panel 1090 can control access to multiple devices 1002, which may or may not be smart devices. Devices 1002 can include, for example, electric locks, elevators, or other devices that require presentment of a credential for use.

In some embodiments, the devices 1002 have been retrofitted to work with a beacon-based system. For example, devices 1002 could have originally been configured to receive signals from a control panel 1090 that is not cloud-enabled to provide access based on receipt of a valid credential from a respective reader 1004 associated with each device 1002. For example, each device could be an electronically actuated door lock originally associated with a card reader, keypad, biometric sensor, etc. Prior to retrofitting, the reader 1004 can receive a credential from a guest seeking access to one of the devices 1002, and forward the received credential to a control panel 1090 for authentication. Upon successful authentication, the control panel can instruct the associated device(s) 1002, e.g., electronically actuated door lock, to provide access.

Maintaining and updating credentialing in such systems can be inefficient and time consuming. Furthermore, such systems are self-contained, and cannot integrate with other smart building systems. Accordingly, in some embodiments, the some or all of the readers 1004 can be augmented or replaced with beacons 1000. The control panel 1090 can be upgraded to be or replaced with a cloud-enabled control panel 1090 that can interface with the cloud-based computing system 100 and/or a mobile device 160 via a cellular network and/or wired/WiFi internet connections.

The operation of the system of FIG. 10 proceeds similarly to the operation described with reference to FIGS. 9A-9B, except that the hub 190 is replaced with an access control panel 1090 that instructs the devices 1002 to perform an action (e.g., unlock a door) upon receipt of a request for an action with a valid credential. In this way, a building system can be retrofitted with a cloud-connected access control panel that enables beacon-based access without having to replace the entire building system. Control from the access panel 1090 to the devices 1002 can proceed the same way as prior to retrofitting. Furthermore, because beacons 1000 can be unpowered beacons, installing such a system in a building is simpler than other cloud-based systems that require a powered smart reader 1004. Furthermore, buildings can be fitted with or retrofitted with cloud-based access systems that can be more easily managed by building managers than traditional systems that require local access to access panels to reconfigure credentials or other management tasks. In addition, unpowered beacons 1000 can be more energy efficient, cheaper, and less prone to problems that may hinder operation of the system. In addition, as described with reference to FIG. 9D, in the event that a user of the system requests access to a device for which the user is not authorized, the user can easily purchase or otherwise gain access using the cloud-based system without having to reconfigure the access panel 1090, device 1002, or the beacon 1000.

Although the present disclosure discloses functions described as being performed by a cloud-based computing node, a person of skill in the art would understand based on the present disclosure that such a node could be implemented using multiple different nodes, for example across multiple different data centers. Functions of the cloud-based computing node described above can instead be implemented in other components of the system, such as, but not limited to a hub, a smart lock, or a smart intercom. In some embodiments, functions of the cloud-based computing node can be redundantly implemented in both the cloud-based computing node and another node to increase security and/or functionality during times that communications with the cloud-based computing node are not available.

Various other modifications and additions can be made to the exemplary embodiments discussed without departing from the scope of the present disclosure. For example, while the embodiments described above refer to particular features or particular steps, the scope of this disclosure also includes embodiments having different combinations of features or steps, and embodiments that do not include all of the above described features or steps. Embodiments can also include other features or steps that are not described herein. Those of skill in the art would appreciate that the various illustrations in the specification and drawings described herein can be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware, software, or a combination depends upon the particular application and design constraints imposed on the overall system. Skilled artisans can implement the described functionality in varying ways for each particular application. Various components and blocks can be arranged differently (for example, arranged in a different order, or partitioned in a different way) all without departing from the scope of the subject technology.

Furthermore, an implementation of the communication protocol can be realized in a centralized fashion in one system, or in a distributed fashion where different elements are spread across several interconnected systems. Any kind of computer system, or other apparatus adapted for carrying out the methods described herein, is suited to perform the functions described herein.

Connections between different devices can be made with or without a wire. For example, the connection between the access control panel and the smart reader can be wired and/or wireless. As another example, the connection between the access control panel and the electronic locking mechanism can be wired and/or wireless.

Figure 15:
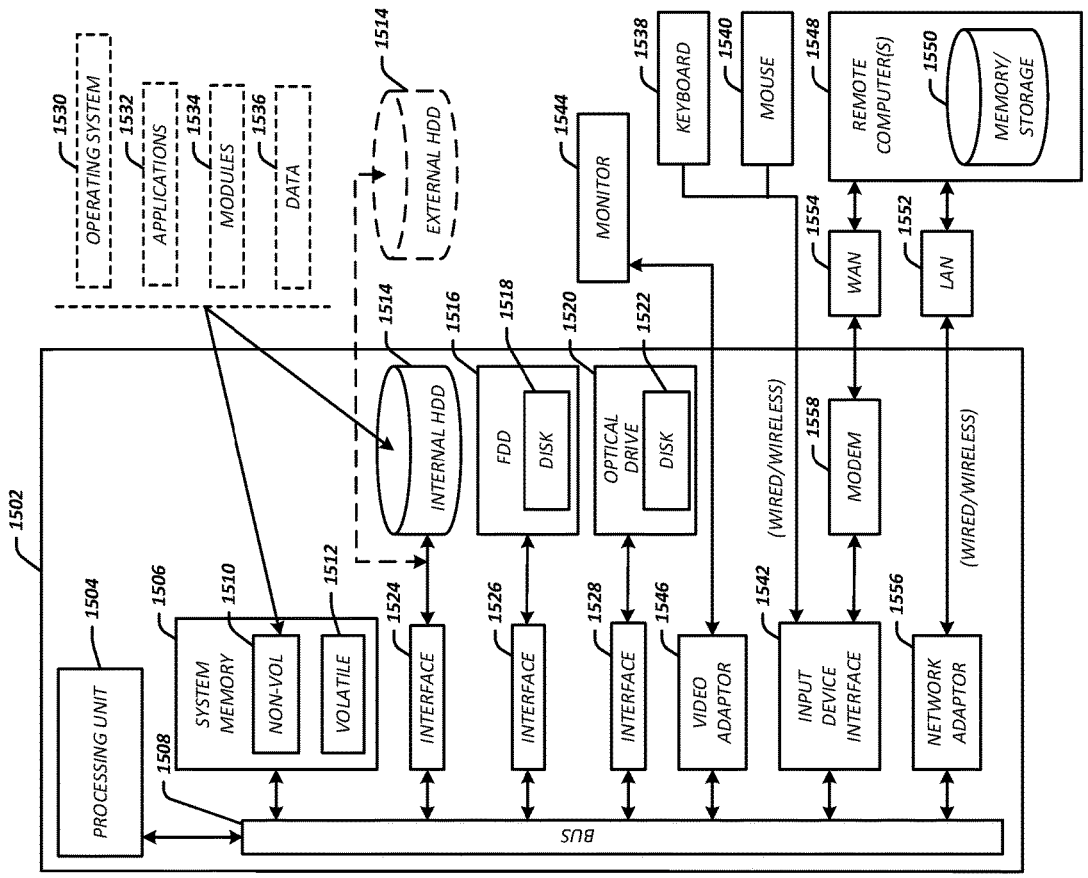
FIG. 15 is an example of a system in accordance with embodiments discussed herein.

FIG. 15 illustrates an embodiment of an exemplary computing architecture 1500 that may be suitable for implementing an apparatus, system, and/or method for performing operations associated with the implementation of one or more of the disclosed techniques, e.g., computing devices, mobile devices, etc. In various embodiments, the computing architecture 1500 may comprise or be implemented as part of an electronic device and/or system discussed herein.

As used in this application, the terms "system" and "component" and "module" are intended to refer to a computer-related entity, either hardware, a combination of hardware and software, software, or software in execution, examples of which are provided by the exemplary computing architecture 1500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1500.

As shown in FIG. 15, the computing architecture 1500 comprises a processing unit 1504, a system memory 1506 and a system bus 1508. The processing unit 1504 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1504. In some embodiments, processing circuitry of processing unit 1504 and/or other processing circuitry of computing architecture 1500 may be operative to perform operations associated with logic flow 500 and/or logic flow 600, and/or other operations associated with implementation of one or more of the disclosed techniques. In some embodiments, such processing circuitry may be coupled to a network interface of computing architecture 1500.

The system bus 1508 provides an interface for system components including, but not limited to, the system memory 1506 to the processing unit 1504. The system bus 1508 can be any of several types of bus structure that may further interconnect to a memory bus (with or without a memory controller), a peripheral bus, and a local bus using any of a variety of commercially available bus architectures. Interface adapters may connect to the system bus 1508 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 15, the system memory 1506 can include non-volatile memory 1510 and/or volatile memory 1512. A basic input/output system (BIOS) can be stored in the non-volatile memory 1510.

The computer 1502 may include various types of computer-readable storage media in the form of one or more lower speed memory units, including an internal (or external) hard disk drive (HDD) 1514, a magnetic floppy disk drive (FDD) 1516 to read from or write to a removable magnetic disk 1518, and an optical disk drive 1520 to read from or write to a removable optical disk 1522 (e.g., a CD-ROM or DVD). The HDD 1514, FDD 1516 and optical disk drive 1520 can be connected to the system bus 1508 by a HDD interface 1524, an FDD interface 1526 and an optical drive interface 1528, respectively. The HDD interface 1524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1510, 1512, including an operating system 1530, one or more application programs 1532, other program modules 1534, and program data 1536.

A user can enter commands and information into the computer 1502 through one or more wire/wireless input devices, for example, a keyboard 1538 and a pointing device, such as a mouse 1540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1504 through an input device interface 1542 that is coupled to the system bus 1508, but can be connected by other interfaces such as a parallel port, IEEE 1394 serial port, a game port, a USB port, an IR interface, and so forth.

A monitor 1544 or other type of display device is also connected to the system bus 1508 via an interface, such as a video adaptor 1546. The monitor 1544 may be internal or external to the computer 1502. In addition to the monitor 1544, a computer typically includes other peripheral output devices, such as speakers, printers, and so forth.

The computer 1502 may operate in a networked environment using logical connections via wire and/or wireless communications to one or more remote computers, such as a remote computer 1548. The remote computer 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wire/wireless connectivity to a local area network (LAN) 1552 and/or larger networks, for example, a wide area network (WAN) 1554. Such LAN and WAN networking environments are commonplace in offices and companies, and facilitate enterprise-wide computer networks, such as intranets, all of which may connect to a global communications network, for example, the Internet.

When used in a LAN networking environment, the computer 1502 is connected to the LAN 1552 through a wire and/or wireless communication network interface or adaptor 1556. The adaptor 1556 can facilitate wire and/or wireless communications to the LAN 1552, which may also include a wireless access point disposed thereon for communicating with the wireless functionality of the adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wire and/or wireless device, connects to the system bus 1508 via the input device interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 315 C.F.R. § 1.152(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, novel subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 16:
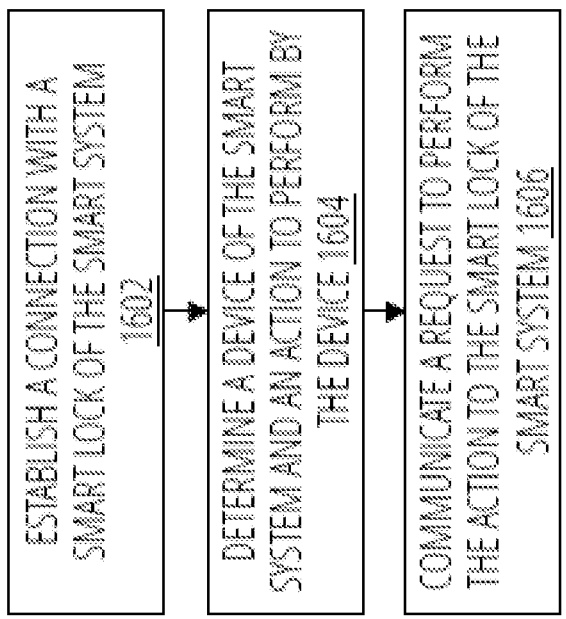
FIG. 16 is an example of a processing flow in accordance with embodiments discussed herein.

FIG. 16 illustrates an example logic flow 1600 that may be performed by one or more device discussed herein. For example, the operations may be performed by a mobile device executing an application to control the devices of a smart system. As previously discussed, a user may utilize a single application to control and operate smart devices including smart access devices and smart home devices. In embodiments, the application is configured to control smart devices in accordance with one or more wireless protocols, such as a near-field communication (NFC) protocol, a cellular protocol, a Bluetooth low energy (BLE) protocol, an 802.11 protocol, a Zigbee protocol, and a z-wave protocol, and so forth. In addition, the application may enable a user to control devices outside of the smart system on a third-party cloud-based computing system. Thus, smart system including the mobile device and application enable a user to have control over pre-existing and/or add-on smart devices.

In block 1602, the logic flow 1600 establishes a connection with a smart lock of the smart system. For example, a mobile device including an application may detect and/or determine that a user wants to perform an action on a smart device. The detection may be based on a user input detected by the mobile device and the mobile device may establish a connection with the smart lock. In some instances, the mobile device may establish a connection with the smart lock automatically, e.g., when the smart lock is within range of the mobile device.

In block 1604, the logic flow 1600 determines a device of the smart system and an action to perform by the device. For example, the mobile device including the application may receive a user input selecting a particular smart device and an action to be performed by the smart device.

In block 1606, the logic flow 1600 communicates a request to perform the action to the smart lock of the smart system. The request may include information that may be used by the smart lock to cause the action. For example, the request may include identifying information to identify the smart device and information to indicate which action is to be performed.

In some instances, the mobile device including the application may receive an indication that the action was successfully perform and/or was not successfully performed. As mentioned, the mobile device including the application may be configured to control smart devices on third-party cloud-based computing system. In some instances, the mobile device may communicate information to the smart lock and the smart lock may communicate with a smart device on the third-party cloud-based computing system. In other instances, the mobile device including the application may communicate directly with a smart device on the third-party cloud-based computing system.

Figure 17:
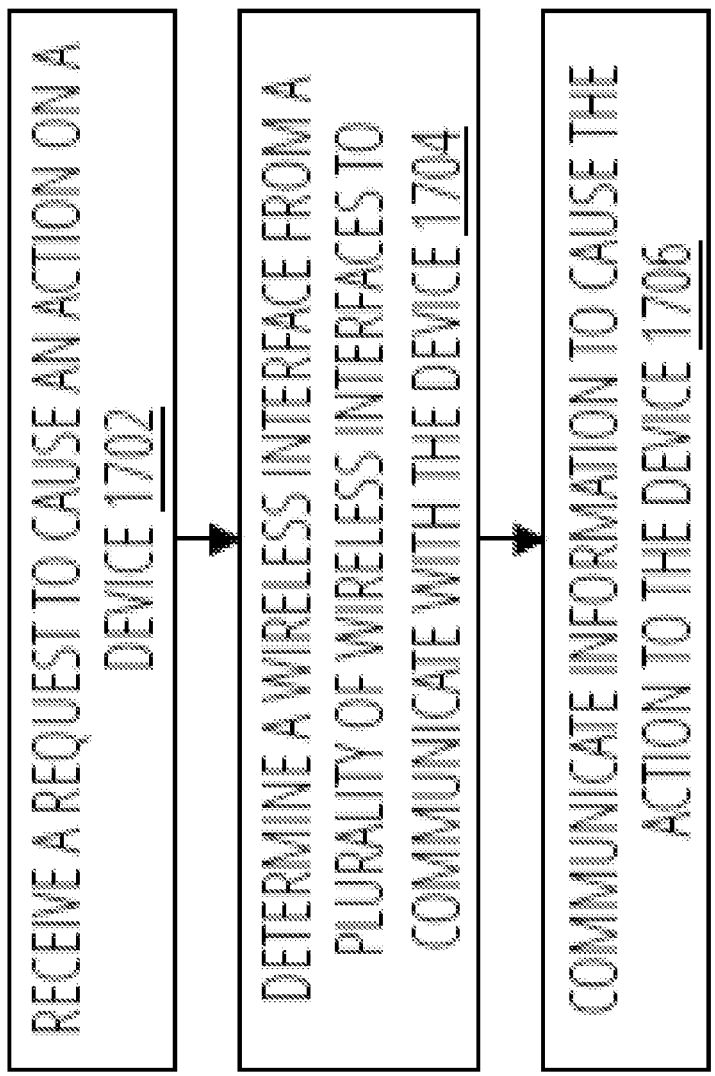
FIG. 17 is an example of a processing flow in accordance with embodiments discussed herein.

FIG. 17 illustrates an example logic flow 1700 that may be performed by one or more device discussed herein. For example, the operations may be performed by smart device, such as a smart lock to control one or more other smart devices. In embodiments, the smart lock may be configured to control smart devices in accordance with one or more wireless protocols. In some instances, the smart lock may communicate on a third-party cloud-based computing system to control third-party smart devices.

In block 1702, the logic flow 1700 receives a request to cause an action on a device. For example, a smart lock may receive a request including information to identify a device and an action to perform on the device from a mobile device. In some instances, the request may be received from a mobile device after a connection is established with the mobile device.

In block 1704, the logic flow 1700 determines a wireless interface from a plurality of wireless interfaces to communicate with the device. For example, the smart lock may determine the device to perform the action based on the information received from the mobile device.

In block 1706, the logic flow 1700 communicates information to cause the action to the device. For example, the smart lock may communicate one or more commands or instructions to the device to cause the device to perform the action.

What is claimed is:

1. A mobile device, comprising:
   processing circuitry;
   a memory coupled with the processing circuitry, the memory including instructions, that when executed by the processing circuitry, cause the processing circuitry to:
   receive, from a beacon device of a smart building system, a uniform resource identifier (URI);
   determine a first access control device of the smart building system and a first action to perform by first access control device, the first action to comprise unlocking the first access control device, wherein the action is determined based on a parameter of the URI, wherein a link between the beacon and the first access control device is created when the beacon is provisioned;
   based on a determination that the mobile device is not permitted to unlock the first access control device, launch a virtual intercom interface based on the URI;

present a virtual directory in the virtual intercom interface, the virtual directory comprising one or more identifiers, each of the one or more identifiers associated with an individual associated with a building comprising the smart building system;
process a selection of an identifier of the one or more identifiers;
send an indication to a recipient device associated with the identifier, the indication to indicate to the individual, via the recipient device, that a user is attempting to contact the individual via the virtual intercom interface to access a space of the building;
receive, from a server, one or more credentials to unlock each of a plurality of access control devices including the first access control device, wherein access to each of the plurality of access control devices is required to provide access to the space; and
transmit the one or more credentials to the first access control device of the plurality of access control devices to unlock the first access control device.

2. The mobile device of claim 1, wherein the memory comprising the instructions, that when executed by the processing circuitry, cause the processing circuitry to:
establish a connection with the recipient device; and
communicate audio communications, video communications, or both with the recipient device over the connection through the virtual intercom interface.

3. The mobile device of claim 1, wherein each of the one or more identifiers comprise a name, a phone number, an email address, a username, or a combination thereof, the memory including instructions, that when executed by the processing circuitry, cause the processing circuitry to:
transmit the one or more credentials to a second access control device of the plurality of access control devices to unlock the second access control device.

4. The mobile device of claim 1, wherein the memory comprising the instructions, that when executed by the processing circuitry, cause the processing circuitry to send the indication over a voice over Internet Protocol (VoIP) channel to the recipient device.

5. The mobile device of claim 1, wherein the memory comprising the instructions, that when executed by the processing circuitry, cause the processing circuitry to send the indication as a text message to the recipient device.

6. The mobile device of claim 1, wherein the memory comprising the instructions, that when executed by the processing circuitry, cause the processing circuitry to send the indication over a plain old telephone service (POTS) channel to the recipient device.

7. The mobile device of claim 1, wherein the memory comprising the instructions, that when executed by the processing circuitry, cause the processing circuitry to receive the URI via a wireless interface, wherein the wireless interface comprises one of a Bluetooth interface, a Near-Field Communication (NFC) interface, a WiFi interface, and a low energy short-range interface.

8. The mobile device of claim 1, wherein the virtual intercom interface is configured to launch in a mobile application associated with the smart building system based on the URI.

9. The mobile device of claim 1, wherein the virtual intercom interface is configured to launch in a web browser.

10. A smart building system, comprising:
processing circuitry;
a memory coupled with the processing circuitry, the memory including instructions, that when executed by the processing circuitry, cause the processing circuitry to:
receive, from a mobile device, a first request to cause an action on a device, the action to comprise unlocking a first access control device of the smart building system, wherein the action of the first request is based on a parameter of a uniform resource identifier (URI) stored in a beacon associated with the first access control device, wherein a link between the beacon and the first access control device is created when the beacon is provisioned;
transmit, to the mobile device, an indication specifying the mobile device is not authorized to unlock the first access control device based at least in part on encrypted data specified in the first request, wherein the encrypted data is based on a public key of the first access control device stored in the beacon;
based on the transmitted indication, receive, from the mobile device, a second request to present a virtual directory in a virtual intercom interface on mobile device, the virtual directory comprising one or more identifiers, each of the one or more identifiers associated with an individual associated with a building comprising the smart building system;
provide the virtual directory to the mobile device;
receive, from a recipient device associated with the individual, a request to provide access to a space of the building;
determining a plurality of access control devices including the first access control device in the building required to provide access to the space;
generating one or more credentials to unlock each of the plurality of access control devices;
transmit the one or more credentials to the mobile device; and
cause, in response to the request and by a sending control signal, access to the first access control device of the plurality of access control devices.

11. The smart building system of claim 10, the memory including instructions, that when executed by the processing circuitry, cause the processing circuitry to, prior to sending the control signal:
receive, from a smart speaker, an instruction specifying to unlock the first access control device.

12. The smart building system of claim 11, wherein the memory comprising the instructions, that when executed by the processing circuitry, cause the processing circuitry to:
receive, via the virtual intercom, a selection of an identifier of the one or more identifiers;
process the selection of the identifier; and
send an indication to the recipient device associated with the identifier, to indicate that a user of the mobile device is attempting to access the space.

13. A computer-implemented method, comprising:
receiving, by a mobile device from a beacon device of a smart building system, a uniform resource identifier (URI);
determine, by the mobile device, a first access control device of the smart building system and a first action to perform by the first access control device, the action to comprise unlocking the first access control device, wherein the action is determined based on a parameter of the URI, wherein a link between the beacon and the first access control device is created when the beacon is provisioned;

based on a determination that the mobile device is not permitted to unlock the first access control device, executing, on the mobile device, a virtual intercom comprising a virtual intercom interface;

processing, by the virtual intercom, a request to contact a recipient device associated with a person associated with a building;

communicating, by the mobile device, an indication to the recipient device, the indication to indicate that another person is attempting to contact via the virtual intercom interface to access a space of the building;

establishing, by the mobile device, a connection with the recipient device;

receiving, by the mobile device and from a server, one or more credentials to unlock each of a plurality of access control devices including the first access control device, wherein access to each of the plurality of access control devices is required to provide access to the space; and transmitting, by the mobile device, the one or more credentials to the first access control device of the plurality of access control devices to unlock the first access control device.

14. The computer-implemented method of claim 13, comprising communicating audio communications, video communications, or both with the recipient device over the connection.

15. The computer-implemented method of claim 14, presenting the audio communications, the video communications, or both received from the recipient device in the virtual intercom interface.

16. The computer-implemented method of claim 13, wherein the indication is sent over a voice over Internet Protocol (VoIP) channel to the recipient device.

17. The computer-implemented method of claim 13, wherein the indication is sent as a text message to the recipient device.

18. The computer-implemented method of claim 13, wherein the recipient device comprises a smart speaker, the method further comprising:

receiving, by a server from the smart speaker, an instruction specifying to unlock another control device; and transmitting, by the server based on the instruction received from the smart speaker, a control signal to the another control device to unlock the another control device.

19. The computer-implemented method of claim 13, wherein the recipient device comprises a smart speaker.

20. The method of claim 19, further comprising:

receiving, by the smart building system from the smart speaker, an instruction specifying to unlock a second access control device of the plurality of access control devices; and transmitting, by the smart building system based on the instruction received from the smart speaker, a signal to unlock the second access control device.

* * * * *